United States Patent [19]

Takahashi et al.

[11] Patent Number: 5,560,336

[45] Date of Patent: Oct. 1, 1996

[54] APPARATUS AND METHOD FOR ESTIMATING STABILITY FACTOR OF COMBUSTION APPLICABLE TO VEHICULAR INTERNAL COMBUSTION ENGINE

[75] Inventors: Nobutaka Takahashi, Yokohama; Kazuma Okura, Yokosuka; Yoshitaka Deguchi, Yokosuka; Toshio Matsumura, Yokosuka, all of Japan

[73] Assignee: Nissan Motor Co., Ltd., Yokohama, Japan

[21] Appl. No.: 403,014

[22] Filed: Mar. 13, 1995

[30] Foreign Application Priority Data

Mar. 11, 1994 [JP] Japan .................................. 6-041069
Mar. 17, 1994 [JP] Japan .................................. 6-047532

[51] Int. Cl.$^6$ ........................ F02P 5/14; G01L 3/26; G06F 19/00

[52] U.S. Cl. ...................... 123/419; 123/436; 123/571; 73/117.3

[58] Field of Search ........................ 123/90.17, 414, 123/419, 425, 435, 436, 350, 571; 73/116, 117.3, 119 A; 364/431.07, 431.08

[56] References Cited

U.S. PATENT DOCUMENTS

| 4,406,265 | 9/1983 | Brandt et al. | 123/425 |
| 4,466,416 | 8/1984 | Kawamura | 123/571 |
| 4,527,523 | 7/1985 | Daumer et al. | 123/436 |
| 4,782,806 | 11/1988 | Hatanaka | 123/486 |
| 4,993,389 | 2/1991 | Ahlborn et al. | 123/419 |
| 5,184,578 | 2/1993 | Quinn, Jr. et al. | 123/90.17 |
| 5,289,805 | 3/1994 | Quinn, Jr. et al. | 123/90.17 |
| 5,379,634 | 1/1995 | Kuroda et al. | 123/419 |
| 5,452,698 | 9/1995 | Denz et al. | 123/419 |
| 5,481,909 | 1/1996 | Deutsch et al. | 123/419 |
| 5,495,415 | 2/1996 | Ribbens et al. | 123/436 |

FOREIGN PATENT DOCUMENTS

| 58-160530 | 9/1983 | Japan . |
| 2-291459 | 12/1990 | Japan . |

*Primary Examiner*—Willis R. Wolfe
*Attorney, Agent, or Firm*—Lowe, Price, LeBlanc & Becker

[57] ABSTRACT

In an apparatus and method for estimating a stability factor of combustions in a vehicular internal combustion engine, a engine revolution synchronized filter processing is carried out for a signal derived in synchronization with the engine revolutions and, thereafter, a time synchronized filter processing is carried out to extract the frequency component correlated to the engine combustion stability factor. Noise components synchronized with the engine revolutions, based on a revolution speed sensor working accuracy error, and based on tire (road) wheel revolution (rotation) first-order vibration frequency are eliminated. In addition, a resonance frequency component in a vehicular drive train is extracted as a frequency component correlated to the combustion stability factor.

28 Claims, 17 Drawing Sheets

APPARATUS AND METHOD FOR ESTIMATING STABILITY FACTOR OF COMBUSTION APPLICABLE TO VEHICULAR INTERNAL COMBUSTION ENGINE

BACKGROUND OF THE INVENTION

1. Field of the Invention

The present invention relates to an apparatus and method for estimating a stability factor of combustion state in each cylinder of an internal combustion engine which is mounted on an automotive vehicle, more particularly, relates to the apparatus and method for eliminating noise components not related to or not correlated to the stability factor from among engine revolution variation components so as to improve an estimating accuracy of the combustion stability factor.

2. Description of the Background Art

A high (preferable) or low (worse) stability factor of combustions in respective cylinders of an internal combustion engine depends upon a frequency characteristic of a revolution variation of the engine (refer to FIG. 13). Therefore, the engine revolution variation is detected, from the detected variation in engine revolutions, the stability factor is estimated, and an air-fuel mixture ratio supplied to the engine is controlled so that the engine stability factor is at an acceptable level.

A Japanese Patent Application First Publication No. Showa 58-160530 published on Sept. 24, 1983 exemplifies a previously proposed engine torque variation controlling method in which the engine revolution variations are extracted via a filter which is met with a bodily sensed vibration (oscillation) characteristic and the extracted variation is feedback controlled so as to reduce the torque variation (surge) of the engine.

However, since noises not related to or not correlated to the stability factor of combustion are generally invaded into a signal indicating the engine revolution speed detected in the above-described method, there is a possibility that an erroneous control for the surge is generated with the noises picked up. Since the frequencies of the noises generated due to a working accuracy error and an installing accuracy error in an engine revolution sensor, due to an imbalance of driven road wheels, and a distortion of a propeller shaft can be predicted, it may be possible to eliminate these noises through such a filter as a band rejection filter. However, since these noises have the frequencies varied according to the engine revolution speed, it is necessary to accurately vary the frequencies to be eliminated in accordance with the engine revolution speed and, hence, it is difficult for the previously proposed engine torque variation controlling method to achieve the accurate estimation of the stability factor of combustion.

On the other hand, a Japanese Patent Application First Publication No. Heisei 2-291459 (published on Dec. 3, 1990) exemplifies a previously proposed surging prevention apparatus of the vehicle in which a surging control is halted when a natural frequency of a vehicular drive train and a revolution primary (first-order) frequency of tire wheel(s) are coincident with each other.

However, although an influence of the first-order vibration (oscillation) on the detection of the revolution variation becomes a largest when its frequency of the tire wheel revolution is coincident with the natural frequency of the vehicular drive train, the influence thereof on the detection of the revolution variation is more or less present even when they are not coincident with each other. Consequently, it is difficult for the previously proposed surging control method disclosed in the latter Japanese Patent Application Publication to improve the estimating accuracy of the combustion stability factor.

SUMMARY OF THE INVENTION

It is an object of the present invention to provide an apparatus and method for estimating a stability factor of combustion of a vehicular internal combustion engine wherein only noise components not related to (or not correlated to) the combustion stability factor are accurately eliminated from among the revolution variation components with simple construction and method and, thereafter, a frequency component related to the combustion stability factor is extracted to improve the estimating accuracy, and, furthermore, the engine revolution variation which gives an unpleasant vibration (oscillation) that a human being bodily senses can be extracted with fidelity.

The above-described object can be achieved by an apparatus for a vehicular internal combustion engine, comprising: a) a revolution synchronizing filter which is so constructed and arranged as to be activated in synchronization with an engine revolution or a revolution of a rotatable vehicular member associated with the internal combustion engine and as to filter a signal related to the engine revolution; b) a time synchronizing filter which is so constructed and arranged as to be activated in synchronization with time and as to filter a frequency component passed through said revolution synchronizing filter; c) engine combustion stability factor estimating means for estimating the stability factor of combustion of the internal combustion engine on the basis of an extracted frequency component by said time synchronizing filter.

The above-described object can also be achieved by providing an apparatus for a vehicular internal combustion engine, comprising: a) reference signal outputting means for outputting a reference signal whenever the engine has rotated through a predetermined angle; b) time measuring means for measuring a generation time interval of the reference signal output from said reference signal outputting means; c) revolution synchronizing filtering means, activated in synchronization with the generation of the reference signal, for filtering data of the measured time interval or data of an engine revolution speed to which the data of the measured time interval is converted; d) time synchronizing filtering means, activated in synchronization with a predetermined time interval, for filtering a filter processed signal from the revolution synchronizing filter means and for extracting a frequency component correlated to a combustion stability factor of the engine; and f) engine combustion stability factor estimating means for estimating the stability factor of combustion of the engine on the basis of the extracted frequency component by said time synchronizing filtering means.

The above-described object can also be achieved by providing an apparatus for a vehicular internal combustion engine, comprising: a) reference signal outputting means for outputting a reference signal for each rotational angle of the engine; b) time interval measuring means for measuring a generation time interval of the reference signal; c) drive power train revolution synchronization signal outputting means for outputting a revolution synchronization signal whenever a drive power train subsequent to an output of a power transmission connected to the engine has rotated through a predetermined angle; d) revolution synchronizing filtering means, activated in synchronization with the generation of the reference signal of the reference signal outputting means or revolution synchronization signal of the drive power train revolution synchronization signal outputting means, for filtering either of data of the measured time interval data or data of an engine revolution speed derived with the data of the measured time interval converted thereinto so as to eliminate at least one predetermined frequency component from the data; e) time synchronizing filtering means, activated whenever a predetermined period of time has passed, for further filtering the filtered data by said revolution synchronization filtering means so as to extract at least one frequency component having a correlation to a stability factor of combustion of the engine; and f) engine combustion stability factor estimating means for estimating the stability factor of combustion of the engine on the basis of the extracted frequency component by said time synchronizing filtering means.

The above-described object can also be achieved by providing a method for estimating a combustion stability factor of a vehicular internal combustion engine, comprising the steps of: a) outputting a reference signal whenever the engine has rotated through a predetermined angle; b) measuring a generation time interval of the reference signal output from said step a); c) being activated in synchronization with the generation of the reference signal, filtering data of the measured time interval or data of an engine revolution speed to which the data of the measured time interval is converted; and d) being activated in synchronization with a predetermined time interval, filtering a filter processed signal from the revolution synchronizing filter step c) and extracting a frequency component correlated to a combustion stability factor of the engine.

BEST MODE FOR CARRYING OUT THE INVENTION

Figure 1:
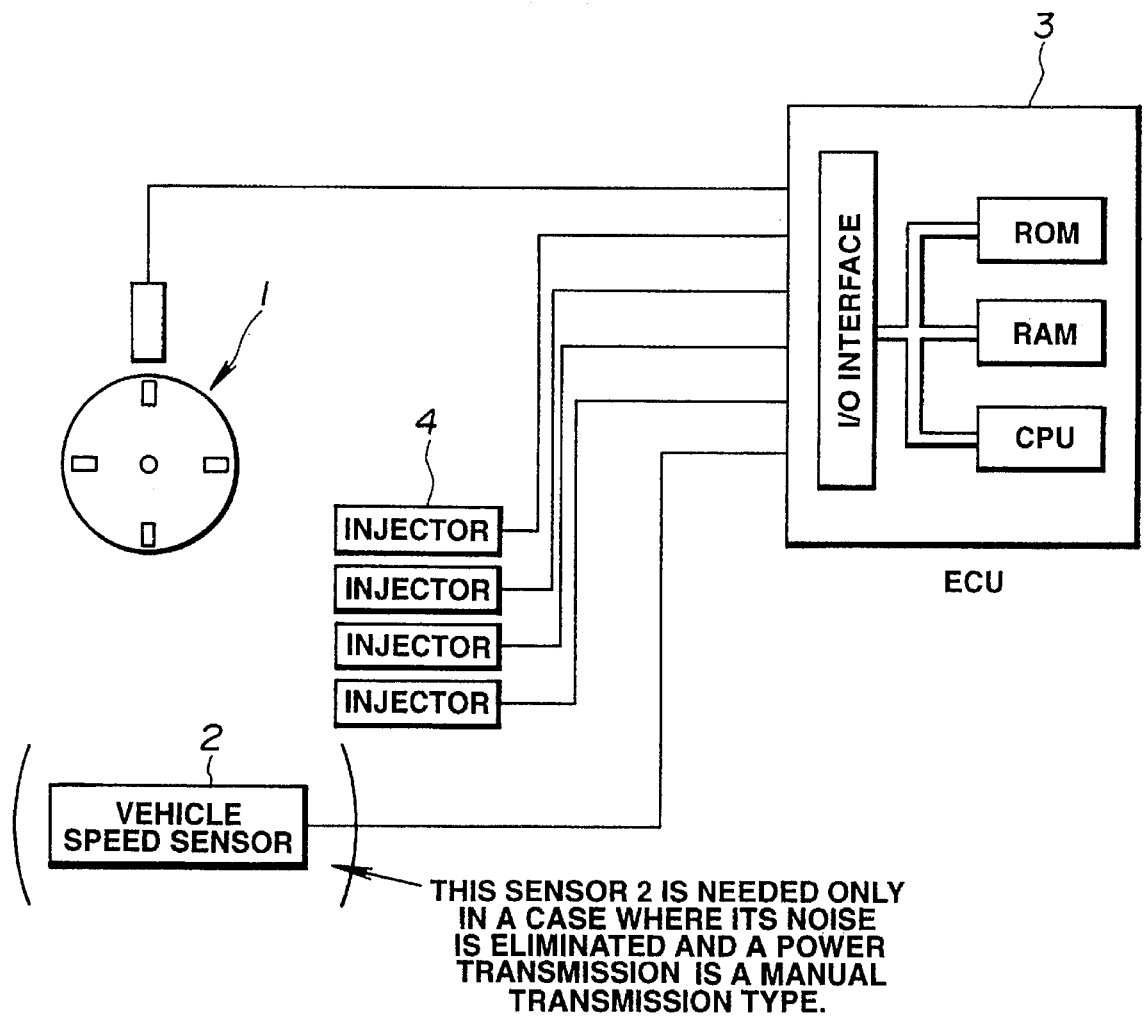
FIG. 1 is a circuit block diagram of an apparatus for estimating a combustion stability factor in a first preferred embodiment according to the present invention.

Reference will hereinafter be made to the drawings in order to facilitate a better understanding of the present invention.

First Embodiment

FIGS. 1 through 9 show a first preferred embodiment of an apparatus for estimating a stability factor of combustion in a vehicular internal combustion engine according to the present invention.

A revolution (rotation) speed sensor 1 is so constructed and arranged on a cam shaft of the internal combustion engine as to detect an engine revolution speed $N_e$. The revolution speed sensor 1 outputs a reference position signal $N_{ref}$ for each cylinder whenever the cam shaft hashas rotated through a given angle corresponding to an ignition timing interval of each cylinder (in a case of a four-cylinder engine, 90 degrees (which corresponds to 180 degrees in an engine crankshaft revolution, and, in a case of a six-cylinder engine, 60 degrees of the cam shaft revolution (which corresponds to 120 degrees in the crankshaft revolution). That is to say, the revolution speed sensor 1 outputs a reference signal whenever the engine has revolved (rotated) through a predetermined angle.

It is noted that the revolution sensor 1 May directly be attached onto the crankshaft.

A vehicle speed sensor 2 is attached onto a vehicular propeller shaft to detect a gear shift ratio of a power transmission connected to the engine.

The vehicle speed sensor 2 is so constructed and arranged on the propeller shaft as to output a reference position signal $V_{ref}$ whenever the propeller shaft has revolved through one revolution. The vehicle speed sensor 2 becomes necessary in a case where such a noise as due to a revolution of tire wheels is to be eliminated and/or the power transmission is of a manual power transmission.

Each reference position signal $N_{ref}$ and $V_{ref}$ are input into an ECU (abbreviation for Engine Control Unit) 3. The ECU 3 is internally provided with a free run timer (FRT), entering an interrupt processing routine upon receipt of the reference position signal $N_{ref}$, calculating a deviation from a previous value of the FRT and measuring an elapsed time $T_{ref}$ between 90 degrees, estimates a stability factor of combustion by executing a first signal processing and a second signal processing for a data of the engine revolution speed $N_e$ which is calculated as a value proportional to an inverse of $T_{ref}$ or $V_{ref}$, and controls a fuel injection quantity injected through a plurality of fuel injectors (fuel injection valves) 4 so that the stability factor indicates a predetermined level.

Upon receipt off the reference position signal $V_{ref}$ from the vehicle speed sensor 2 (or an output shaft of the power transmission), the ECU 3 calculates the vehicle speed V in the same way as the engine revolution speed $N_e$ and calculates the gear shift ratio $N_d$ from a ratio between the engine revolution speed $N_e$ and vehicle speed V. In the case off the manual transmission, since the gear shift ratios are set to specific values $n_1$, $n_2$, - - - , $n_i$ (already known) of the gear shift ratio for each gear shift position (gear ratio), one of the gear shift ratios $n_j$ (j=1, 2, - - - ) which is nearest to the detected $n_d$ from among these specific values is detected as the gear shift ratio.

Although an airflow meter to detect an intake air quantity Q, a coolant water temperature sensor, ignition plugs, and EGR (Exhaust Gas Recirculation) control valve are present around the ECU 3, these explanations are omitted herein.

Next, a method for detecting the gear shift ratio, a method of the first signal processing, and a method of the second signal processing will be described below.

Figure 2:
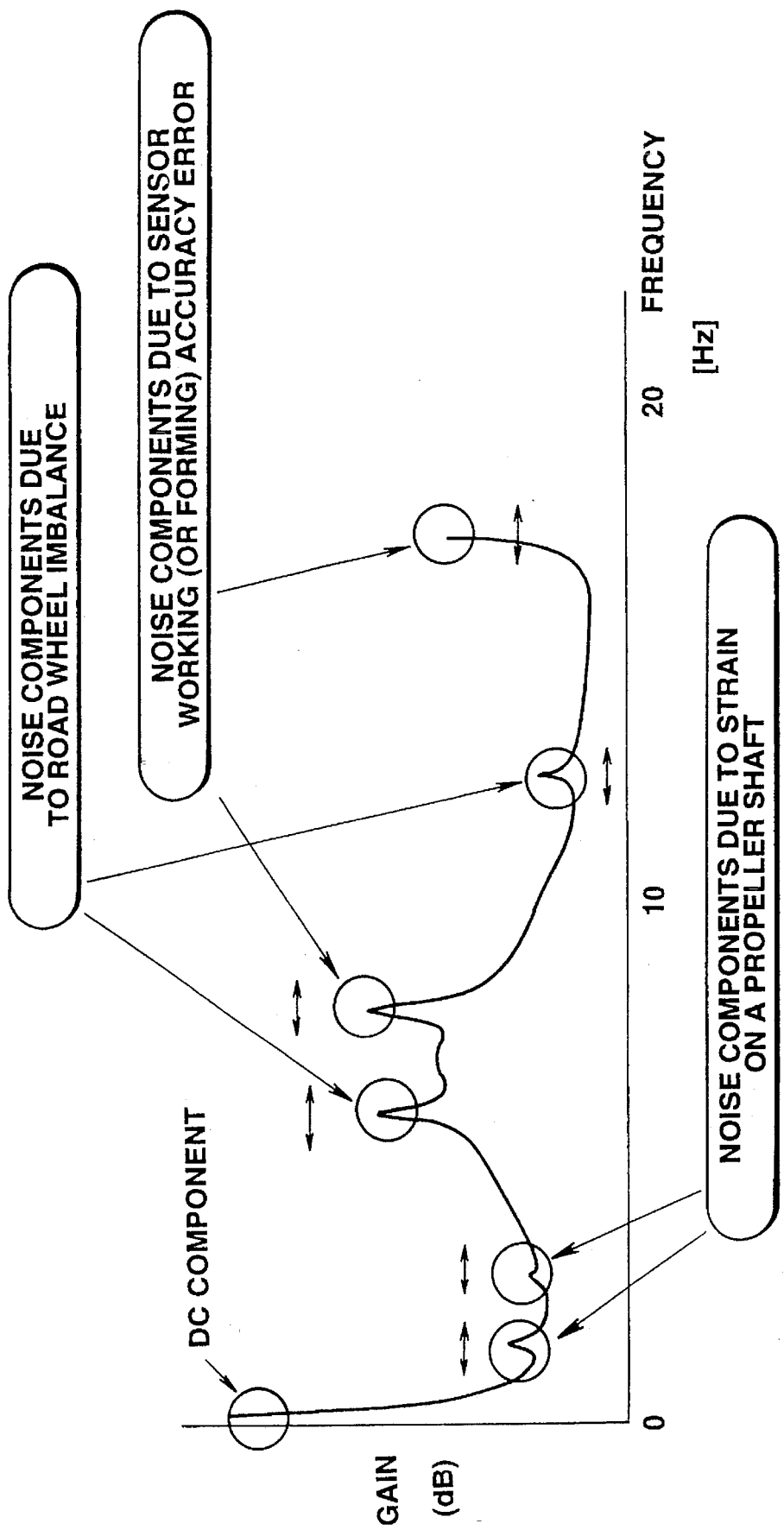
FIG. 2 is a frequency characteristic graph of an engine revolution variation on which noise components are indicated.

A time series signal of the elapsed time $T_{ref}$ or the engine revolution speed $N_e$ is processed by means of a FFT (Fast Fourier Transform) analyzer so that such a frequency characteristic as shown in FIG. 2 is exhibited.

Components not related (not correlated) to the stability factor of engine combustion include: (1) DC component; (2) component caused by a working accuracy error of the sensor(s); and component generated due to the strains in a tire (road) wheel imbalance or propeller shaft, these components being noise components.

However, the noise components except the DC component have frequencies varied in accordance with the engine revolution speed $N_e$ so that it is difficult to completely eliminate the noises using a previously proposed time synchronization digital filter.

Figure 3:
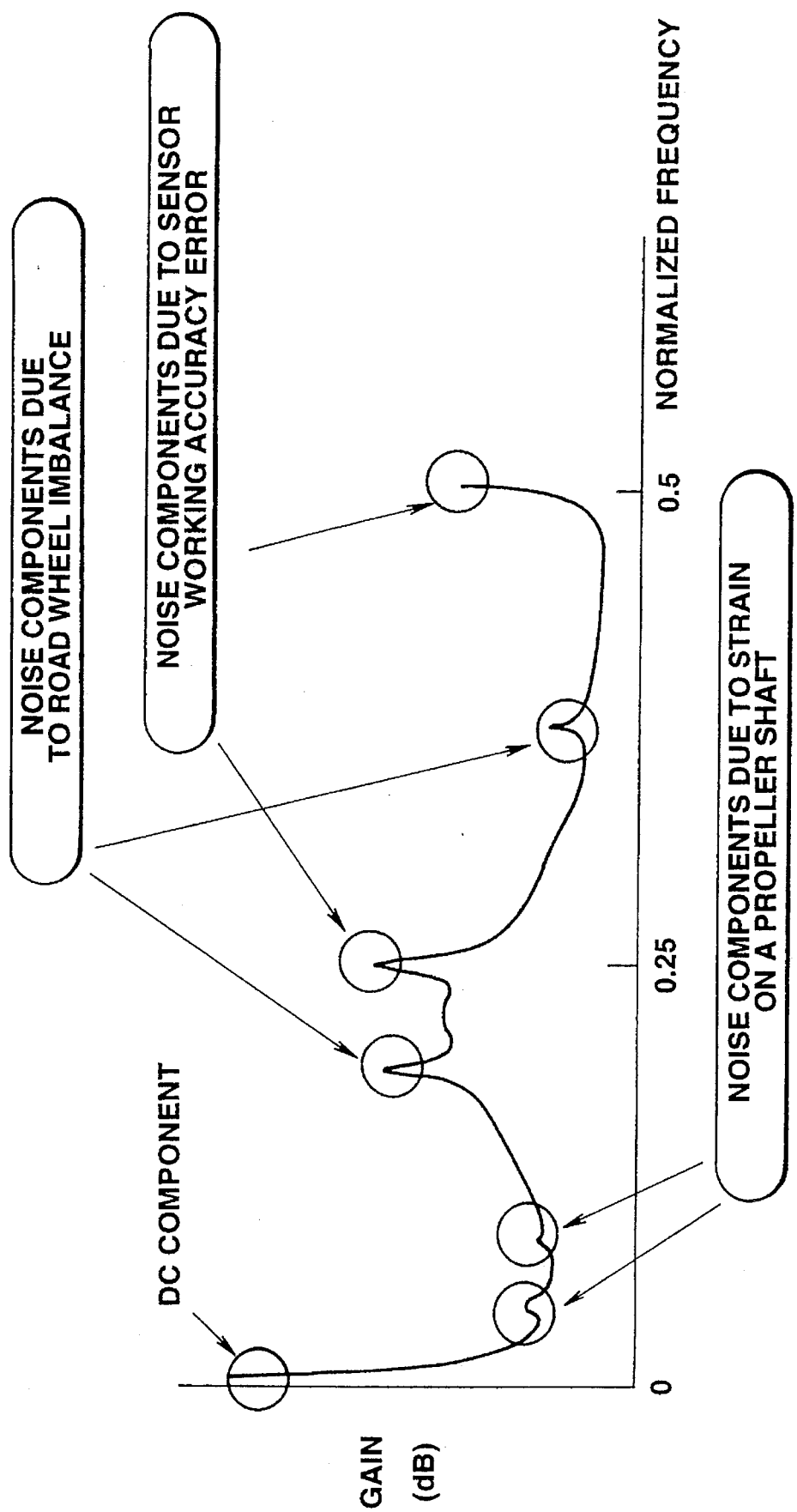
FIG. 3 is a frequency characteristic graph of the engine revolution variation when a lateral axis of FIG. 2 is normalized with respect to the frequency of the engine revolution synchronization signal.

Anyway, if a lateral axis of FIG. 3 is normalized with a frequency of the reference position signal $N_{ref}$ (normalized frequency=frequency/$N_{ref}$ signal frequency), the frequency of the noise components due to the working accuracy error of the sensors as shown in FIG. 3 is fixed, namely, a plotted position of FIG. 3 remains unchanged on which the noise components appear even if the revolution speed $N_e$ is changed (varied).

In addition, provided that the gear shift ratio is constant, the frequencies of the noise components due to the rotational strains in the vehicular drive train from the power transmission (propeller shaft) to the driving tire wheels and due to the tire wheel imbalance are fixed with respect to the engine revolution speed $N_e$ when the normalization with respect to the $N_{ref}$ frequency is carried out.

For example, in the case of the four-cylinder engine, the noises caused by the sensor working accuracy error have frequency components of 0.25 (engine two revolutions) and 0.5 (engine one revolution) (refer to FIG. 3), the noises due to the tire wheel imbalance have frequency components of 0.5 $n_w$, $n_w$, - - - , the noises due to the strain of the propeller shaft have frequency components of 0.5 n, n, - - - . In the above-described cases, the gear shift ratio of the power transmission is n and $n_w$ denotes the gear shift ratio n multiplied by a final speed-reduction ratio.

In the first embodiment, the noise components in the engine rotational speed $N_e$ calculated from $T_{ref}$ or in the $T_{ref}$ signal itself are selectively eliminated by means of the first signal processing procedure in the form of a digital filter activated in synchronization with the $N_{ref}$.

The first signal processing procedure will be explained in accordance with the operational flowchart of FIG. 4.

In the case of the first signal processing, only the noise components due to the working accuracy error in the revolution speed sensor 1 and the rotational first-order components due to the tire wheel imbalance are considered as the noises to be eliminated.

In addition, for the higher-order components of the tire wheel's revolutions, the elimination frequency band of a band rejection filter (BRF) is appropriately set so that the same arithmetically processed routine is carried out. Hence, the explanation of the elimination of the higher-order revolution component will be omitted herein.

Figure 4:
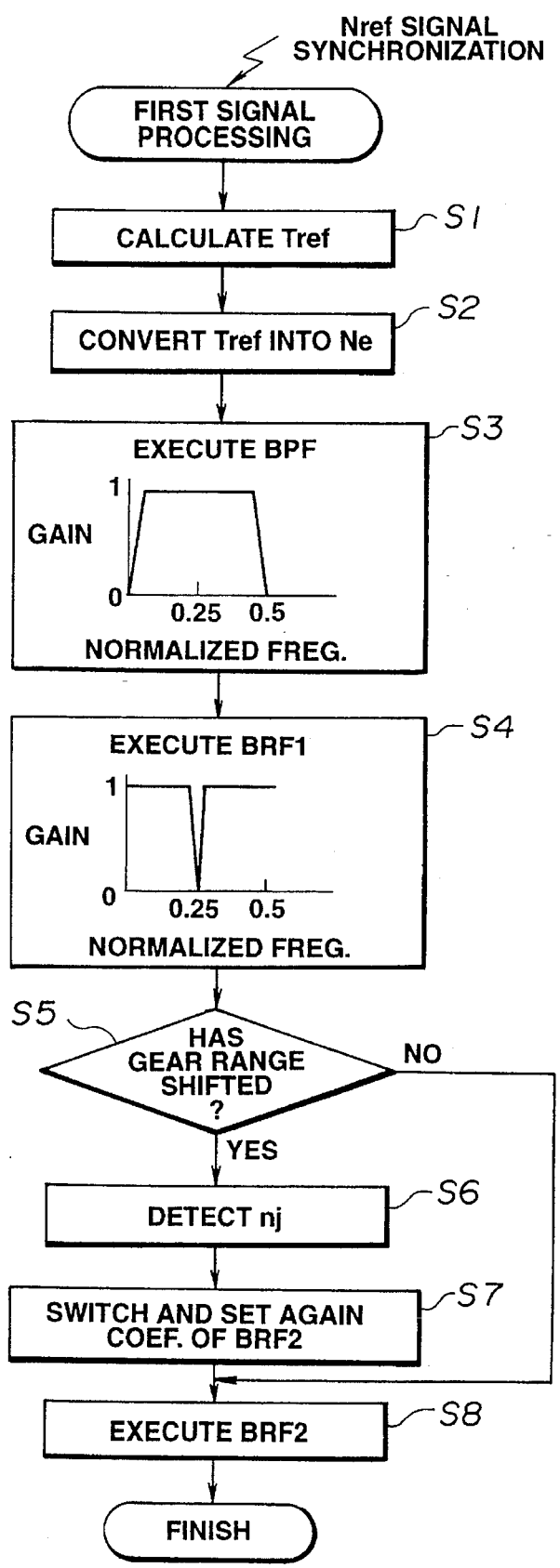
FIG. 4 is an operational flowchart indicating a first signal processing routine in the case of FIG. 3.

The first signal processing routine shown in FIG. 4 is executed by the ECU 3 which is activated in synchronization with the $N_{ref}$ signal, namely, with the engine revolutions.

At a step S1, the CPU of the ECU 3 calculates the elapsed time $T_{ref}$ (see) between the previously input $N_{ref}$ signal and the presently input $N_{ref}$ signal.

At a step S2, the elapsed time $T_{ref}$ is converted into the engine revolution speed $N_e$ as described below.

However, since it is sufficient to confirm a magnitude ( degree of surge ) of the engine speed variation, the data of $T_{ref}$ can directly be used and this step S2 may be omitted.

$N_e = 30/T_{ref}$, four-cylinder engine.

At a step S3, a BPF (Band-Pass Filter) eliminates the noise component corresponding to 0.5 with respect to the normalized frequency from among the noise components including the DC component not related to the stability factor of combustion of the internal combustion engine and components due to the working accuracy error of the sensor 1.

A transfer function of the BPF is expressed below:

$$BPF: H(z) = (a_1 - 1)^2(1 - z - 2)/\{a_1^2 - (a_1 - 2)^2 z^{-2}\} \quad (1).$$

At a step S4, a first band rejection filter (BRF1) serves to eliminate the noise component corresponding to 0.25 with respect to the normalized frequency from among the components due to the working accuracy of the sensor 1.

The transfer function of the BRF1 is expressed below:

$$BRF1.H(z) = (a_2 - 1)(1 + z^{-2})/\{a_2 + (a_2 - 2)z^{-2}\} \quad (2).$$

At steps S5 through S8, the first-order component of revolutions of the tire wheels (driven wheels) is eliminated.

It is noted that the first-order tire wheel revolution component has the component of the frequency $F_c \times N_w$ when the revolution frequency of an output shaft of the engine normalized by a measuring period is $F_c$, the gear shift ratio of a gear shifting mechanism connected subsequent to the output shaft of the internal combustion engine is $N_w$. For example, when the normalized engine revolution speed $N_e$ is 0.5 (when $T_{ref} = 500$ msec, $N_{ref}$ signal frequency: 20 Hz, engine revolution frequency : 10 Hz → normalized frequency=0.5) and gear shift ratio is 0.25 (gear ratio 1/0.25), the first-order frequency of the tire wheel revolution is 0.5×0.5=0.125. Hence, at the steps S5 through S8, the digital filter to eliminate the frequency component of $F_c \times N_w$ is executed.

First, at the step S5, the CPU determines whether the gear shifting occurs (the gear speed-range is changed). If the gear shifting occurs (Yes at the step S5), the gear speed ratio $n_d$ is derived from the ratio between the engine revolution speed $N_e$ and the vehicle speed V detected by the vehicle speed sensor 2. From the known gear shift ratios, one of the gear ratios which is nearest to the known gear shift ratio is selected to determine the gear shift ratio $n_j$.

At the step S7, filter coefficients of the frequency elimination filter (second-order band rejection filter BRF2) are switched and set again.

At the step S8, the BRF2 is executed using the set filter coefficients of the frequency elimination filter so as to eliminate the frequency components in problem.

$$BRF2{:}(z^{-1}) = (\alpha - 2\alpha\beta z^{-1} + \alpha z^{-2}) / \{1 - 2\alpha\beta z - 1)\} / \{1 - 2\alpha\beta z^{-1}(2\alpha - 1) z^{-2}\},$$
$$\text{wherein } 0 < \alpha < 1,\ 1 \leq \Theta \leq 1 \quad (3).$$

In the equation (3), $\alpha$ denotes a constant approximately determining a band width of the elimination frequencies and $\beta$ determines a constant defined correspondingly to the elimination frequency determined according to the revolution frequency $F_c$ of the output shaft of the internal combustion engine normalized with respect to the measuring period and the gear shift ratio $N_w$ of the gear shifting mechanism of the power transmission connected to the output shaft of the engine.

It is noted that the transfer function of the BRF1 in the equation (2) is substitutions of $\alpha = (a_2 - 1)/a_2$ and $\beta = 0$ in the transfer function of the BRF2 of the equation (3).

The digital filters described above can eliminate the noise components due to the working accuracy error of the sensor 1 and tire wheel revolution first-order vibration noise component due to the tire wheel imbalance and due to the strain in the propeller shaft.

Since, in the first embodiment, the power transmission is the manual transmission and the gear shift ratio is derived from the ratio between the engine revolution speed $N_c$ and vehicle speed V, in this case, it is not necessary to install a gear shift ratio sensor. In the first embodiment, the vehicle speed sensor generally installed for another control system can be utilized, thus the apparatus for estimating the combustion stability factor being cost-effective. In the first embodiment, since the present invention is applicable to an automatic power transmission having a fluid coupling such as a torque converter and having a lock-up function, the gear shift ratio may be calculated on the basis of the instruction signal issued to the automatic power transmission during the effective lock-up functioning. In addition, in the case where the lock-up is not carried out, the transmission of the noises caused by the vehicular drive train becomes small due to a high-frequency revolution variation absorbing function. Therefore, it is not necessary to carry out the noise elimination of the noises due to the strain of the propeller shaft and due to tire wheel imbalance through the filter processing described above.

On the other hand, with the above-described filters executed by means of a microcomputer taken in mind, a division operation can be substituted by a shift arithmetic operation with $a_1$ and $a_2$ supposed as a power of 2. This is a great advantage in achieving the microcomputer.

The above-described equation of (1) for the BPF can be modified as follows with the input being set as u (=engine revolution speed N) and the output set as y:

$$Y_t = \{(a_1 2)^2 Y_{t-2} + (a_1 - 1)^2 (u_t - u_{t-2})\} \div a_1^2.$$

wherein a subscript t denotes a latest (newest) value and t–i denotes a value before the i-th number of times.

For example, if $a_1 = 256$, the following equation is established:

$$Y_t = \{254^2 y_{t-2} + 255^2 (u_t - u_{t-2})\} \div 256 \quad 2.$$

Figure 5:
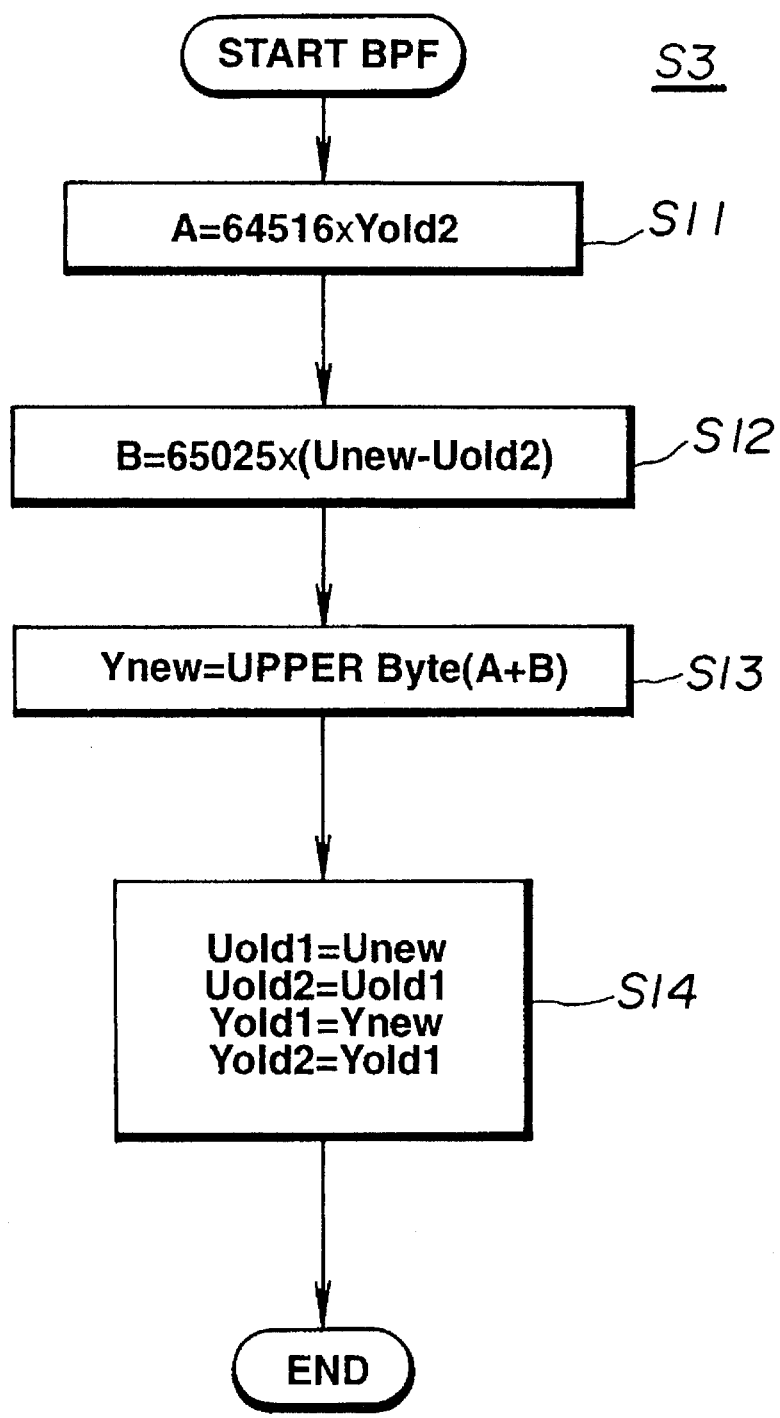
FIG. 5 is an operational flowchart indicating a subroutine at a step S3 of FIG. 4.

This equation can be achieved by the microcomputer, for example, Z80 with a program flowchart shown in FIG. 5. Suppose herein that both input data U and output data Y are two byte data.

FIG. 5, thus, shows a subroutine of a step S3 executed by the microcomputer.

At a step S11, the CPU executes a multiplication of a power (2, square) of 254 (=64516) by the output of $Y_{old2}$ before two times number (twice) of times to derive four byte data.

At a step S12, the CPU subtracts the input before two number of times (twice) $U_{old2}$ from the presently input $U_{new}$ and multiplies the subtracted result by the square of 255 (=65025).

At a step S18, the values of A derived at the step S11 and of B derived at the step S12 are added together and upper two bytes are taken to set $Y_{new}$. This method such that upper two bytes are adopted and the remaining lower two bytes are truncated (omission of fractions) can be a substitution for the division by the square of 256. If $a_1$ is a value of other factorials of 2, the above-equation of $Y_{new}$ can be achieved by the same omission of fractions and bit shifting in place of the division operation. Therefore, the division operation can be omitted.

At a step S14, each data is shifted for each one timing to the next timing of derivations.

In the same way, the equation (2) of BRF1 is expressed as follows:

$$Y_t = \{-(a_2-2)Y_{t-2} + (a_1-2)(u_t + u_{t-2})\} \div a_2.$$

For example, suppose herein that $a_2 = 256$.

$$Y_t = \{254 Y_{t-2} + 255(u_t + u_{t-2})\} \div 256.$$

Figure 6:
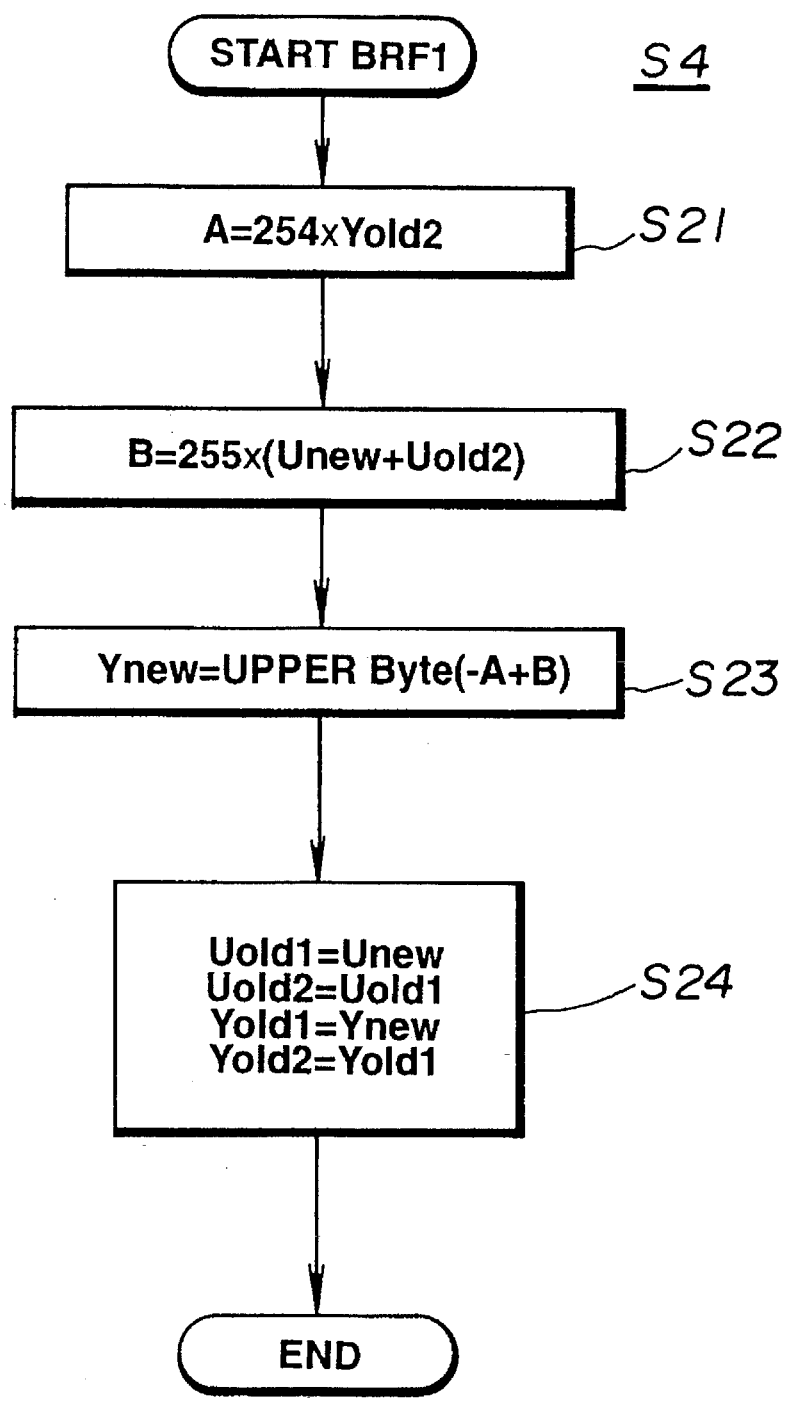
FIG. 6 is an operational flowchart indicating a second signal processing routine at a step S4 of FIG. 4.

FIG. 6 shows a subroutine of the step S4 achieved by the microcomputer when $a_2 = 256$.

At a step S21, the CPU multiplies 254 by the output $Y_{old2}$ before two number of times (twice) to derive A in three bytes.

At a step S22, the CPU adds the presently input $U_{new}$ to the input $U_{old2}$ before twice number of times and multiplies the added result by 255.

At a step S23, the CPU subtracts the value A derived at the step S21 from the value of B derived at the step S22 and fetches the upper two bytes to derive $Y_{new}$. Since the upper two bytes are adopted and the lower one byte is truncated (omission of fractions), this method is the substitution for the division by 256.

At a step S24, each data is shifted for each one timing to derive the values of above-described steps S21 through S23 at the next timing of derivations.

It is noted that the equation (3) of BRF2 can be achieved by the microcomputer but the detailed subroutine is herein omitted since the method thereof is appreciated from FIG. 6 in the case of the BRF1.

Figure 7:
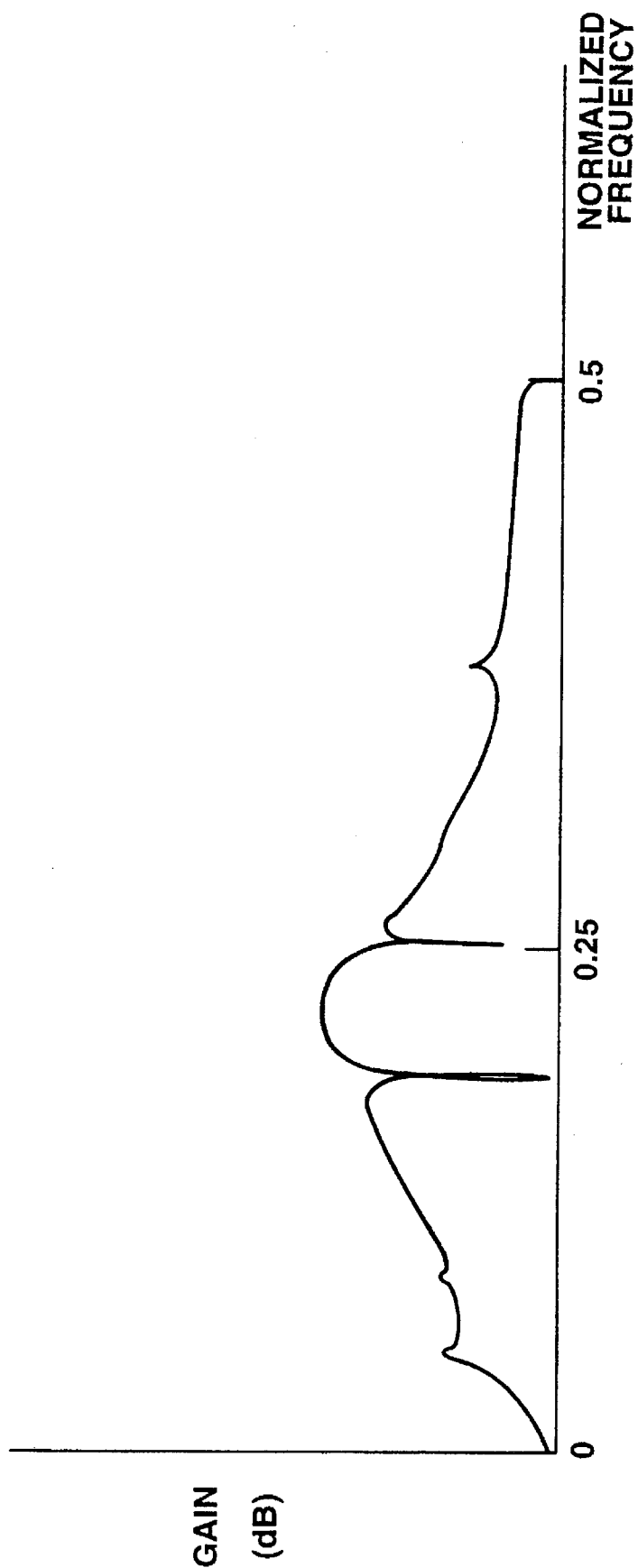
FIG. 7 is an normalized frequency component after completion of the first signal processing routine shown in FIG. 4.

As described above, the noise components which are not related or correlated to the stability factor of combustion can accurately be eliminated as shown in FIG. 7.

The revolution synchronization processing in the first embodiment is activated within the routine executed in synchronization with the $N_{ref}$ signal.

However, this is not limited to the routine executed in synchronization with $N_{ref}$ signal.

Figure 10:
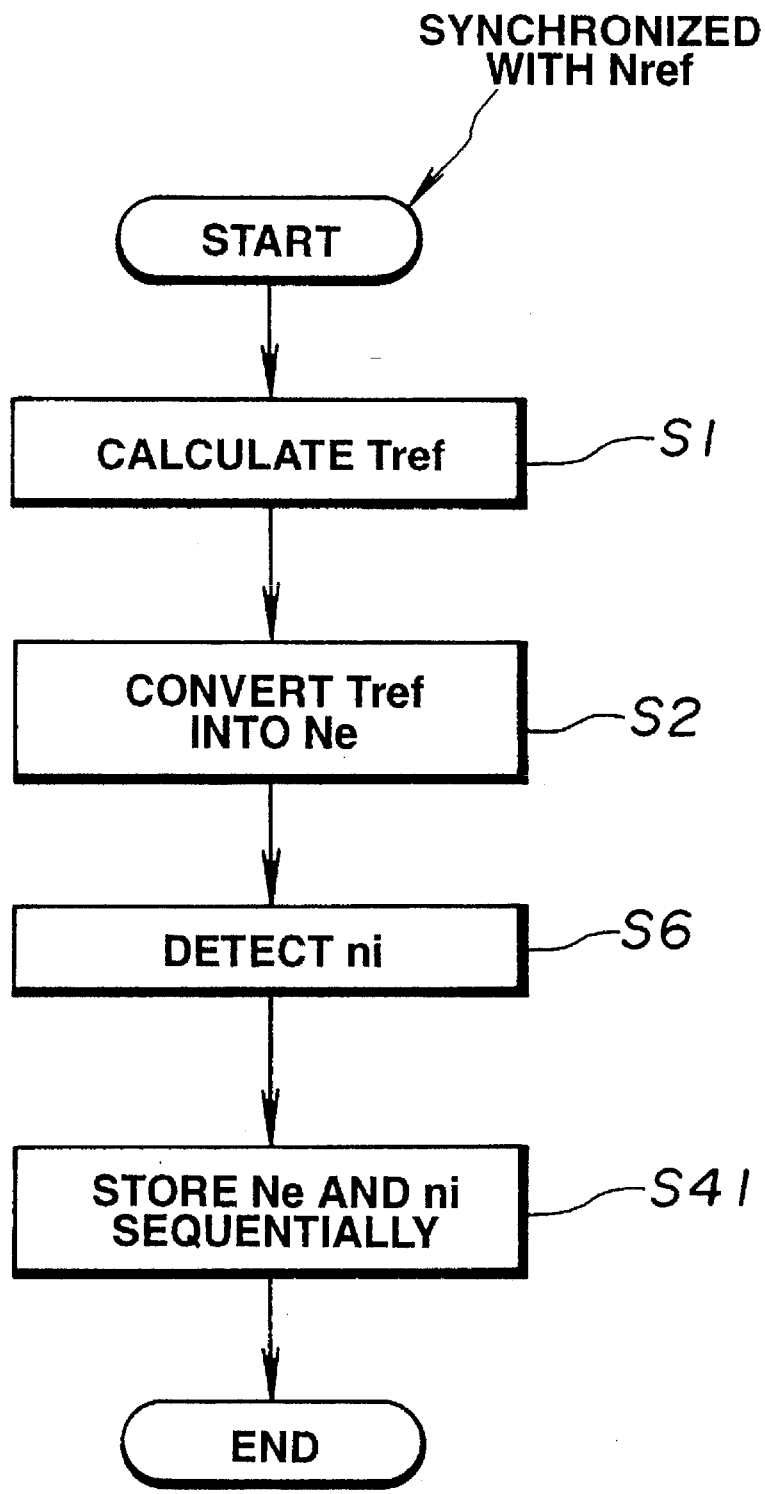
FIG. 10 is an operational flowchart indicating a modification of the second signal processing routine shown in FIG. 9.
Figure 11:
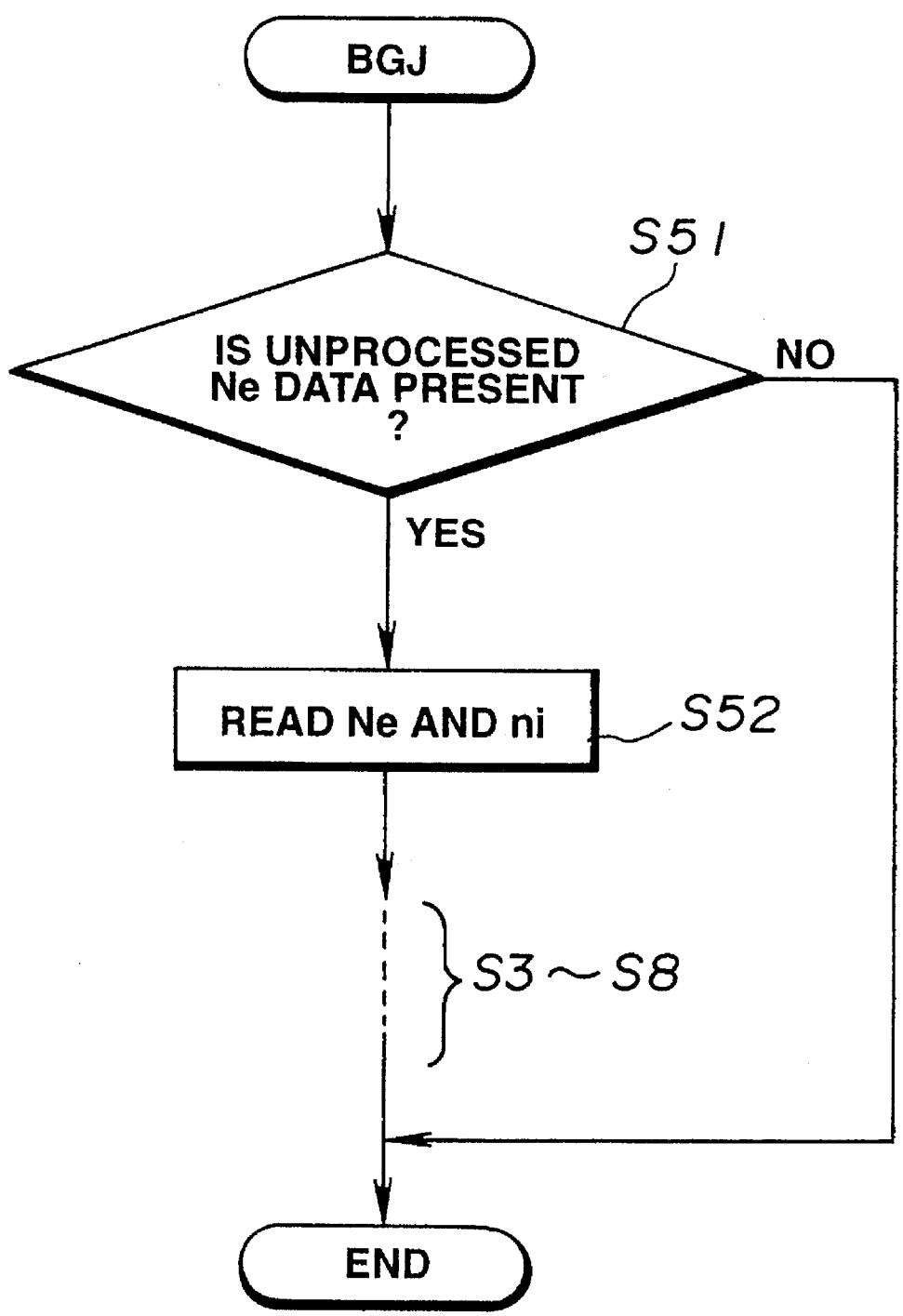
FIG. 11 is an operational flowchart indicating another modification of the second signal processing routine shown in FIG. 9.

For example, the filter processing routines executed at arbitrary timings can be installed independently of each other (refer to FIGS. 10 and 11).

In this case, as shown in FIG. 10, the CPU calculates only $N_e$ in the routine executed in synchronization with $N_{ref}$ signal, stores the calculated data into storing means such as the RAM, and activates the filtering process routine (FIG. 11) at an arbitrary timing, reads sequentially the stored data in the calculation order to process the filtering. Thus, the same result can be obtained in the same way as the activation of the filtering process in synchronization with the generation of $N_{ref}$.

If the above-described processing method shown in FIGS. 10 and 11 is adopted, the first embodiment according to the present invention can be realized by the inexpensive CPU having a relatively low processing capability since it is possible to have the CPU integrally processed for the revolution synchronization filtering when a margin is provided in the processing capability of the CPU (namely, jobs to be handled by the CPU are less).

Figure 12:
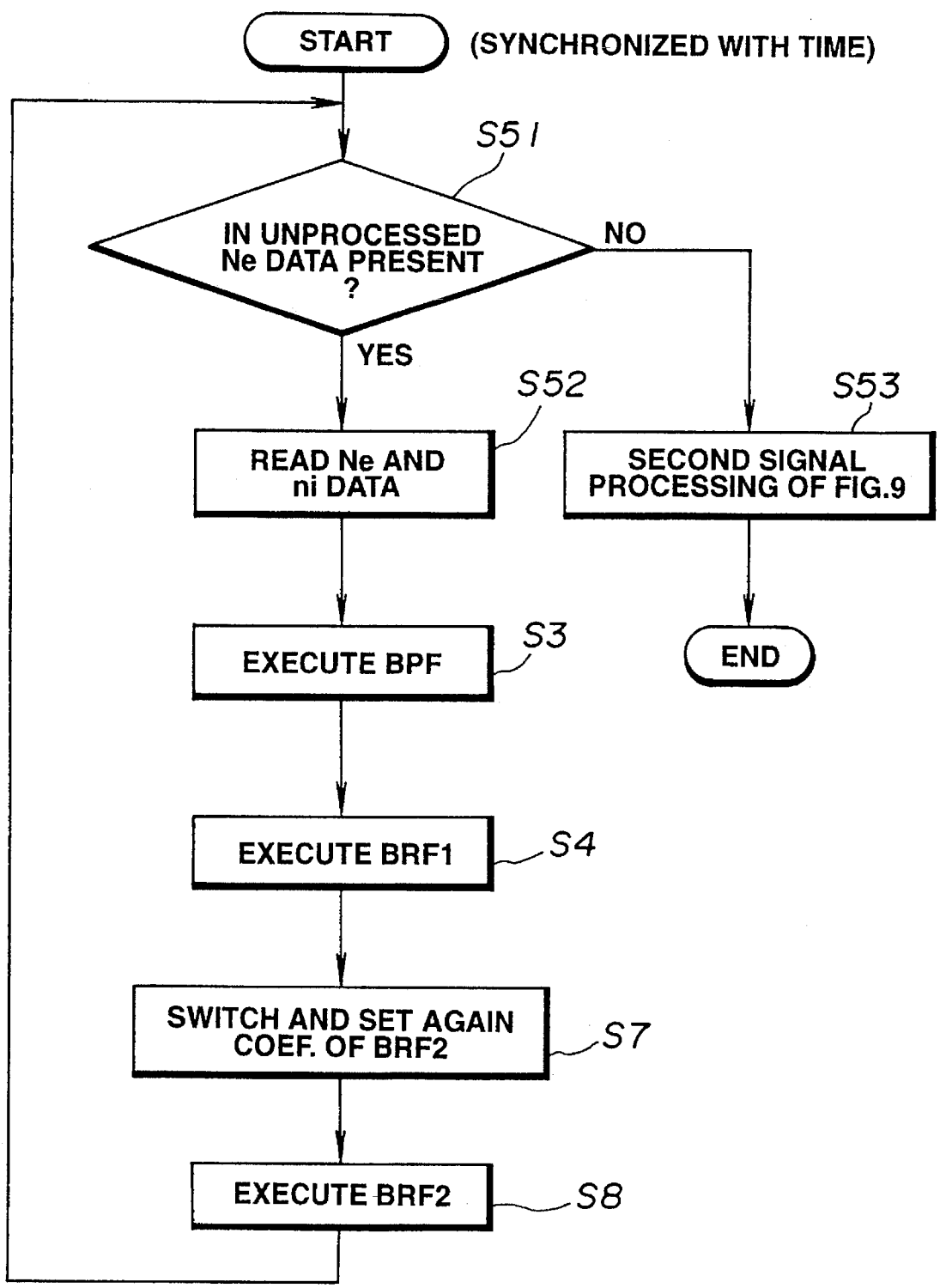
FIG. 12 is an operational flowchart indicating a still another modification of the second signal processing routine shown in FIG. 11.

It is noted that it is necessary to complete the revolution synchronization processing for the data until the revolution speed $N_e$ calculated immediately before the activation when a time synchronization filter is activated (as will be described later). Therefore, the CPU confirms whether the data of $N_e$ for which the revolution synchronization filtering handles is left unprocessed before the time synchronization filtering is executed (refer to FIG. 12). If the unprocessed data of $N_e$ is left, the revolution synchronization processing is first executed and, thereafter, the time synchronization filter is activated.

Next, the second signal processing will be described below.

Since the estimation of the combustion stability factor is finally needed to take a bodily sensed vibration characteristic of a human kind into consideration, the variation in engine revolution speed having the required frequency band is extracted by means of a generally available time synchronization filter processing. In the first embodiment, the digital filter activated for each predetermined time interval is used for the revolution variation signal whose noise components are eliminated in the first signal processing.

An influence of an unstable combustion factor of the internal combustion engine appears in a largest manner on components in a proximity to a resonance frequency occurring in the vehicular drive train from among the revolution variation components and an unpleasant feeling to a vehicular occupant due to vehicular body vibrations is large.

Thus, in the second signal processing, in order to extract more purely the information of the combustion stability factor, a band pass filter (BPF) is used to extract the signal which falls in the resonance frequency band of the vehicular drive train. It is noted that since the resonance frequency in the vehicular drive train is generally determined according to a gear shift position (gear ratio), the BPF is needed to be so constructed and arranged as to extract all of the resonance frequencies to all gear shift positions or to extract the components in proximity to resonance frequency of the vehicular drive train with parameters in the BPF switched according to respective gear shift positions.

Since an output waveform of the BPF is such a characteristic that its amplitude is increased as the combustion of the internal combustion engine becomes unstable, an amplitude average or an effective value corresponding value of the output waveform of the BPF set according to a required estimation speed and estimation accuracy is set as an index of the combustion stability factor. It is possible to estimate the combustion stability factor by comparing its amplitude with previously set one or more average levels.

Figure 8:
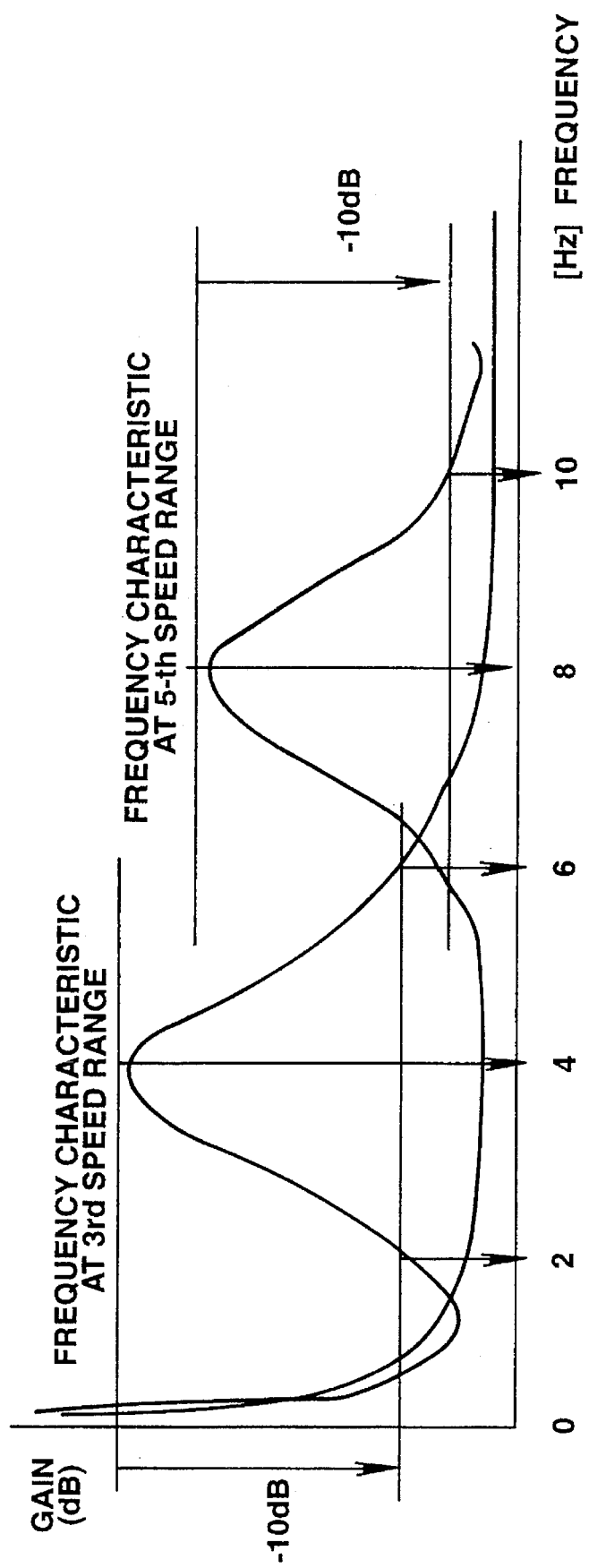
FIG. 8 is characteristic graphs of the frequency components representing the variations due to a change in a gear shift ratio.

As shown in FIG. 8, suppose that the gear shift positions which are possible to estimate the combustion stability are from a third gear shift range to a fifth gear shift range, a peak value of the frequency characteristic corresponding to 4 Hz and frequencies at which the gain are reduced by −10 dB from 4 Hz peak value being 2 Hz and 6 Hz. In the same way, in the case of the fifth speed range, the peak value corresponds to 8 Hz and frequencies reduced by −10 dB correspond to 6 Hz and 10 Hz. Thus, the frequency band to be passed through the BPF is 2 to 10 Hz. The BPF in the second signal processing is constituted by a software executed by the microcomputer in the case of the first signal processing.

It is noted that the BPF in the second signal processing, i.e., the digital filter is required to be activated whenever the predetermined time has passed (for example, for 10 msec.). The digital filter form is an IIR (Infinite Impulse Response) type filter as described below.

$$F(Z^{-1}) = \left( \sum_{n=1}^{k} A_n Z^{-n} \right) / (\Sigma B_n Z^{-n}).$$

The signal passed though the IIR type digital filter described above is used to calculate, for example, the effective value to convert it into the index of the combustion stability factor.

Figure 9:
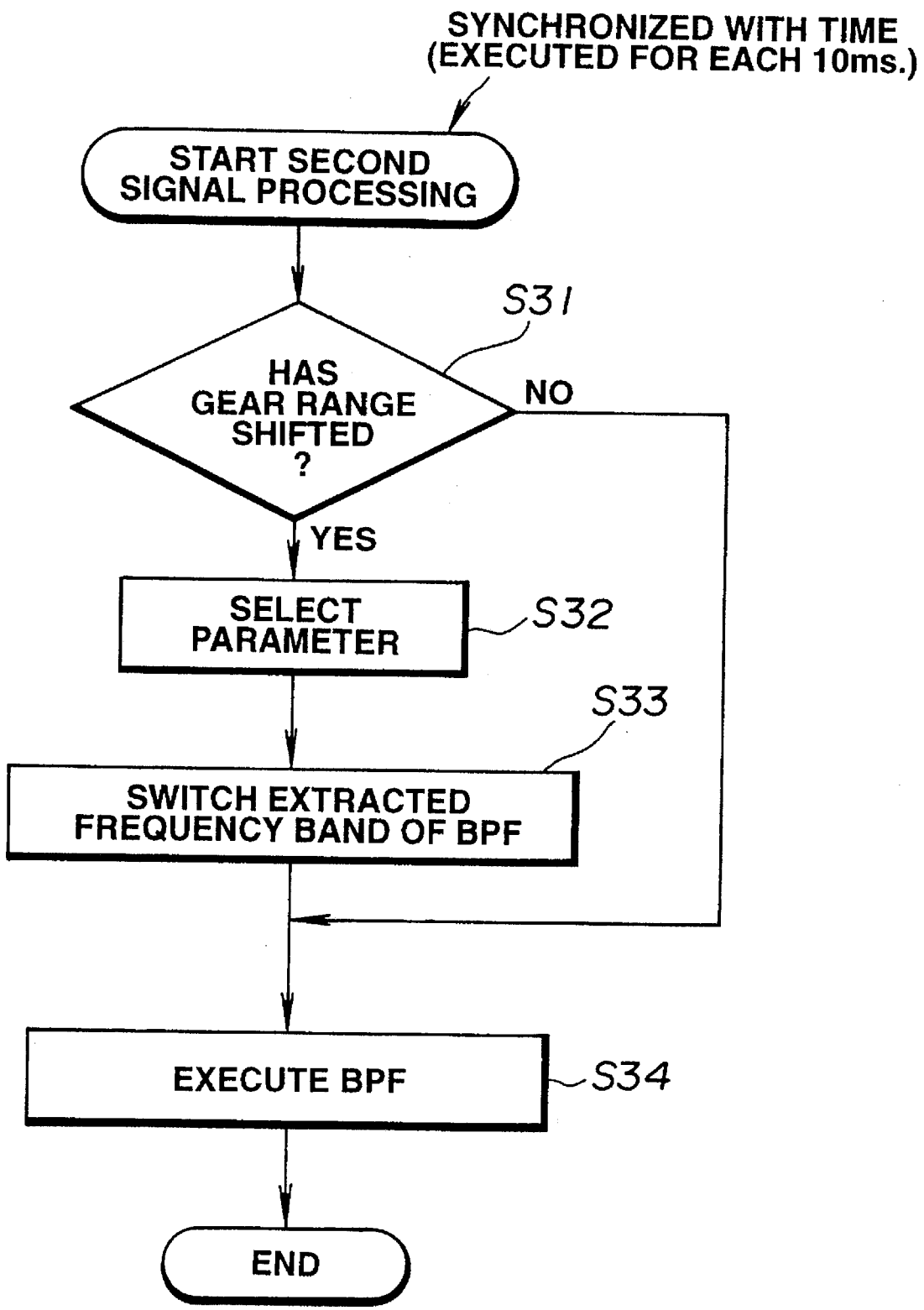
FIG. 9 is an operational flowchart indicating a second signal processing routine in the case of FIG. 3.

FIG. 9 shows the processing routine in the case of the second signal processing.

At a step S31, the CPU determines whether the gear shift range is changed.

If Yes at the step S31, the routine goes to a step S32 in which the parameters of the BPF are selected so as to meet with the resonance frequency components of the vehicular drive train whose frequencies are varied according to the gear shift position.

At a step S33, the frequency band of the BPF is switched according to the selected parameters so as to extract the resonance frequency components of the vehicular drive train.

At a step S34, the CPU executes the time synchronization filtering process using the BPF whose frequency band to be passed is switched at the step S33 or is fixed at the step S31 when no gear shift range change occurs.

SECOND EMBODIMENT

Figure 14:
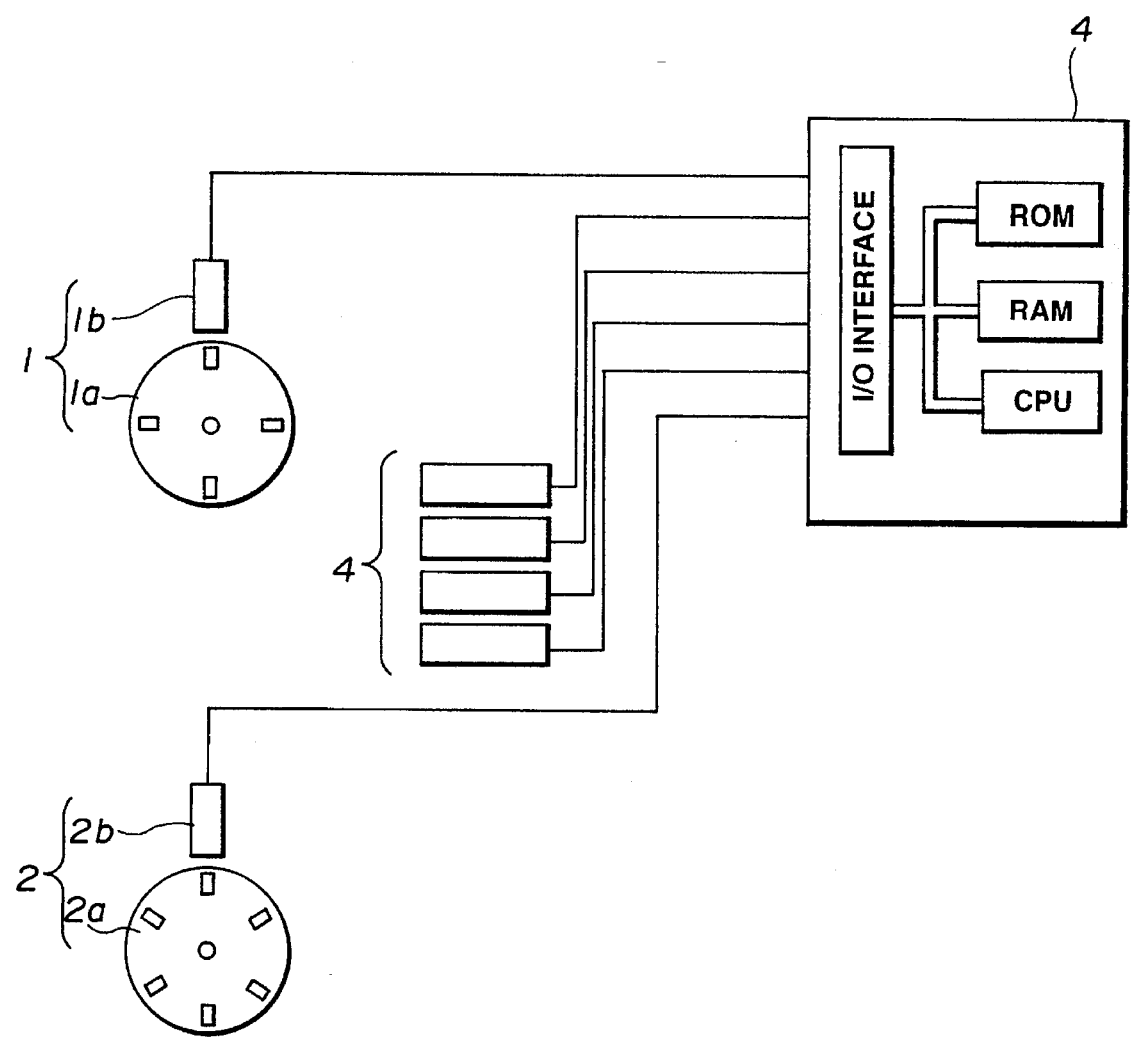
FIG. 14 is a circuit block diagram of the combustion stability factor estimating apparatus according to the present invention in a second preferred embodiment.

FIG. 14 shows a second preferred embodiment of the combustion stability factor estimating apparatus according to the present invention.

As shown in FIG. 14, a cam revolution sensor 1 includes a cam timing plate 1a having equally spaced magnet cores (or projections) and an electromagnetic pick up sensor 1b faced against the cam timing plate 1a.

The cam revolution sensor 1 is so constructed and arranged as to generate an alternating current signal of one period for each predetermined cam revolution angle by the projections for detecting the cam revolution angle disposed on the cam timing plate 1a for an interval of the predetermined cam angle (for example, whenever the cam rotating axle has revolved through 90 degrees which correspond to 180 degrees in a engine crankshaft revolution) traversing a magnetic field generated from an iron core of the electromagnetic pick up sensor 1b.

The above-described alternating current signal serves as the reference position signal for detecting the piston reference position of each cylinder in the case of the four-cylinder engine (so called, the reference signal). In the case of the six-cylinder engine, the alternating current signal serves as the reference signal if the projections are set and the reference signal is generated whenever the cam rotating axle has rotated through 60 degrees.

The alternating current signal is supplied to the control unit 4 to be converted into a pulse signal by which a time interval required for the cam rotating axle has rotated through the predetermined angle is measured to determine the engine revolution speed $N_e$.

In the second embodiment, the cam angle sensor 1 is used to determine the engine revolution speed $N_e$. Alternatively, the crank angle sensor which outputs the reference position signal whenever the crankshaft has rotated through a predetermined angle may be used. In addition, in place of the electromagnetic pick up sensor 1b, an optical pick up sensor may alternatively be used with a plurality of slits disposed on a periphery of the cam timing plate 1a, each slit being faced against the optical pick up sensor whenever the cam rotating axle has rotated through the predetermined angle.

On the other hand, a revolution sensor 2 for the vehicular drive train is installed on a drive axle subsequent to the vehicular power transmission, for example, an output shaft of the power transmission, the propeller shaft, or drive shaft so as to detect its revolution speed. The structure of the drive train revolution sensor 2 is generally the same as that of the cam angle sensor 1. The drive train revolution sensor 2, in the second embodiment, includes: an output shaft plate 2a attached onto the output shaft of the power transmission; and an electromagnetic pick up sensor 2b. The output shaft timing plate 2a is provided with a plurality of projections so that the electromagnetic pick up sensor 2b outputs the alternating current signal whenever the output shaft has rotated through a predetermined revolution angle (for example, 60 degrees).

It is noted that the generation frequency of the alternating current signal needs to be set twice or more the frequency to be eliminated. This is because if the generation frequency described above is twice less than the frequency to be eliminated, it is impossible for the digital filter to eliminate the frequency component due to a sampling theorem.

It is also noted that it is possible for the revolution sensor 2 to be attached onto a revolution axle such as the drive shaft which revolves with the output shaft of the power transmission at a constant revolution speed ratio. In this case, the frequency to be eliminated by means of the digital filter may appropriately be set according to a speed reduction ratio ( revolution speed ratio) and signal output frequency (angle between each projection) .

The generated alternating signal from the revolution sensor 2 is input to the control unit 4 and converted into the pulse signal. The revolution sensor 2 can be used as the vehicle speed sensor. That is to say, on the basis of the revolution speed of the output shaft of the power transmission measured with the required time for the drive axle to be revolved through the predetermined angle and the final speed reduction ratio of the radius of a tire wheel to a differential gear, the vehicle speed can be detected.

A plurality of electromagnetic type fuel injection valves 4 are disposed in an intake air system of the engine to function as actuators to control the combustion stability. Each opening duration of the fuel injection valves 4 is controlled on the basis of drive signals from the control unit 4 so that the fuel injection quantity supplied to the engine and its timing are adjusted.

Figure 15:
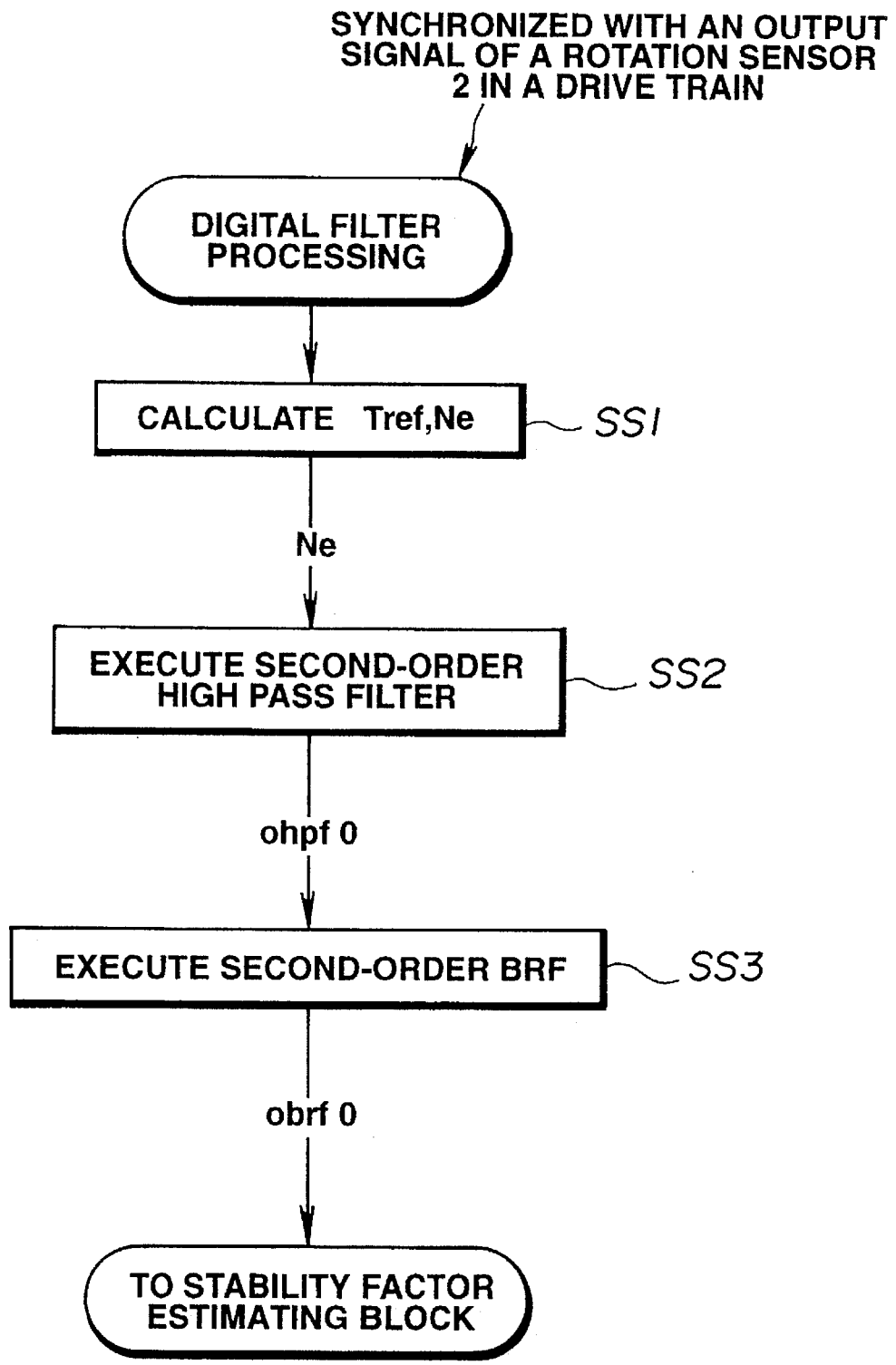
FIG. 15 is an operational flowchart for explaining a revolution synchronized filter processing in the second embodiment shown in FIG. 14.

FIG. 15 shows a processing routine of the digital filter in the case of the second embodiment.

In is noted that the flowchart shown in FIG. 15 is executed in synchronization with the output signal period of the drive train revolution sensor 2.

For explanation purpose, suppose that a road (tire) wheel first-order vibration frequency component is superposed on the engine revolution speed $N_e$ as the noise. Since the higher harmonics of the first-order vibration frequency can be explained in the same way by a multiple of their orders of the frequency to be eliminated, their explanations are omitted herein.

Since, for the first-order vibration frequency component of the propeller shaft revolution and its higher harmonics, the frequency to be eliminated by the digital filter is set by multiples of the speed reduction ratio defined by a gear mesh of the power transmission for the elimination frequency in the case of the tire wheel first-order vibration frequency, their explanations are omitted herein.

At a step SS1, the control unit 4 receives the output signal from the drive train revolution sensor 2 and measures the generation time interval $T_{ref}$ of the reference position signal from the cam angle sensor 2 in synchronization with the drive train revolution sensor 2, and calculates the engine revolution speed $N_e$ using the following equation:

$$N_e = 3.0 \times 10^7 / T_{ref}.$$

The arithmetic processing of the engine revolution speed $N_e$ may be omitted as far as the digital filter processing is concerned. This is because the revolution variation may be derived according to the generated time interval $T_{ref}$ without deriving the engine revolution speed $N_e$.

The measurement of the generated time interval $T_{ref}$ of the reference position signal is carried out by means of a free-run timer (FRT) disposed within the control unit 4. In details, the control unit 4 executes the interrupt processing upon receipt of the reference position signal, derives the deviation between the measured time from a time at which the previous input of the reference position signal occurs and measured time from a time at which the subsequent input of the reference position signal occurs so that the generated time interval $T_{ref}$ of the reference position signal for each revolution through 90 degree of the cam rotating axle is detected.

At a step SS2, the control unit 4 eliminates the DC component not related to the combustion stability factor of the internal combustion engine. The DC component can be eliminated using the well known Butterworth second-order high pass filter.

At a step SS3, the tire wheel revolution first-order vibration frequency component not related to the combustion stability factor of the internal combustion engine is eliminated from the revolution speed $N_e$ or the measured $T_{ref}$ signal in which the DC component has been eliminated. Since the tire wheel revolution first-order vibration component appears at one period per tire wheel revolution, the tire wheel revolution first-order vibration component is always superposed on the engine revolution speed $N_e$ signal or the measured $T_{ref}$ signal detected between the output signal time intervals in the sensor output of the drive train revolution sensor 2 on the normalized frequency with respect to the frequency of the drive train revolution sensor 2 as a fixed frequency component even if the tire wheel revolution first-order vibration frequency is varied with the vehicle speed varied. In the second embodiment, since the output signal of the drive train revolution sensor 2 is generated whenever the output shaft of the power transmission has rotated through 60 degrees, the tire revolution first-order vibration component is superposed on the $N_e$ signal or $T_{ref}$ signal at a constant frequency of 1/6/N (=60/360/N, wherein N denotes the final speed reduction ratio) irrespective of variations in the tire wheel revolution first-order vibration frequency and in the engine revolution speed when the vehicle speed is varied and the gear shift ratio is varied.

In this way, if the engine revolution speed $N_e$ or $T_{ref}$ is detected in synchronization with the output signal of the drive train revolution sensor 2, the tire wheel revolution first-order vibration frequency can extremely easily be specified as the component superposed at the constant frequency of 1/6/N with respect to the engine revolution speed $N_e$ signal or $T_{ref}$ signal irrespective of the engine revolution speed $N_e$. Consequently, the tire wheel first-order vibration frequency component can easily be eliminated.

At the step SS3, the control unit 4 executes the following second-order band rejection filter so that the tire wheel revolution First-order vibration frequency component can highly accurately be eliminated irrespective of the engine revolution speed and gear shift ratio.

$$H(z^{-1})=(\alpha-2\alpha\beta z^{-1}+\alpha z^{-2})/(1-2\alpha\beta z^{-1}+(2\alpha-1)z-2)$$

$0<\alpha<1$, $0 \leq \beta \leq 1$, $\alpha$ denotes the constant to approximately determine the frequency band width and $\beta$ denotes the constant defined correspondingly to the elimination frequency. It is noted that $z^{-n}1$ denotes the value measured before the n–th number of times.

In the second embodiment, since the digital filter processing is executed in synchronization with the output signal of the drive train revolution sensor 2, the tire wheel revolution first-order vibration frequency component can highly accurately be specified and completely be eliminated at all times even if the tire wheel revolution first-order vibration frequency component to be superposed on the engine revolution speed $N_e$ is varied together with the variations in the vehicle speed or gear shift ratio.

The execution result of the digital filter in the second embodiment is shown in FIGS. 16A and 16B.

Figure 16:
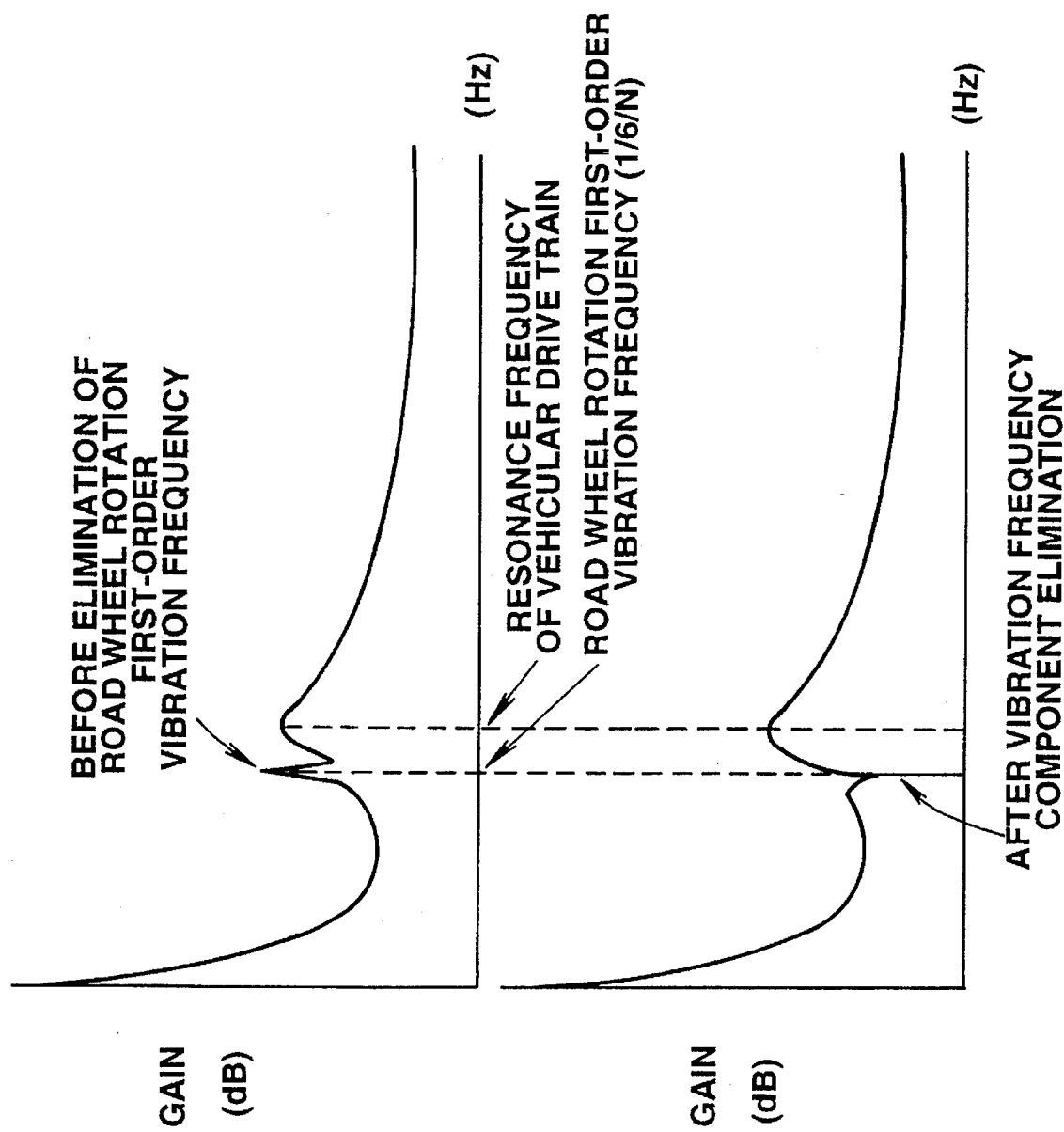
FIG. 16A and 16B are characteristic graphs representing execution results of an engine revolution synchronization filter in the case of the second embodiment shown in FIG. 14.
Figure 17:
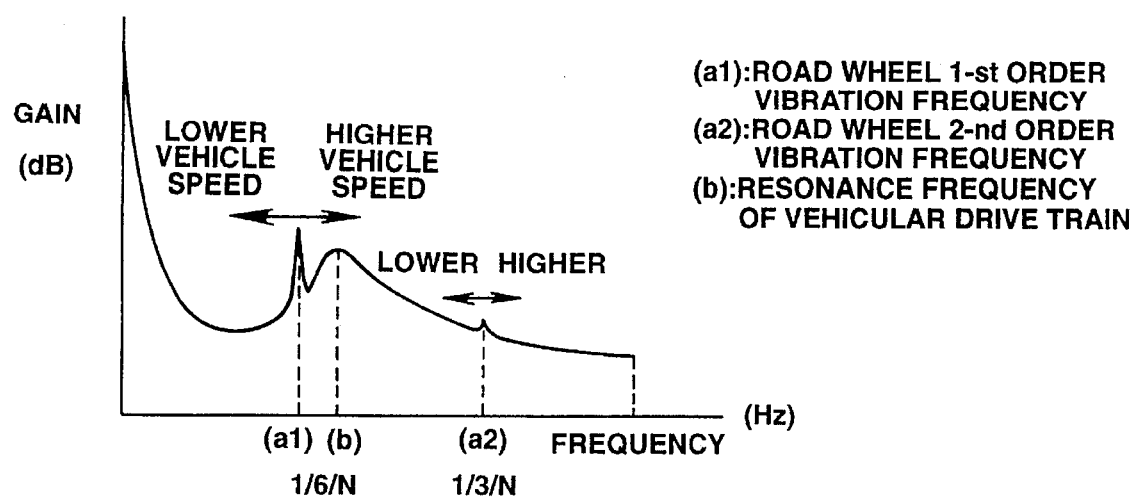
FIG. 17 is an explanatory view for explaining a time synchronization filter for comparing it with the engine revolution synchronization filter shown in FIGS. 16A and 16B.

FIG. 16 A shows the frequency characteristic of the engine revolution speed including the tire wheel revolution first-order vibration frequency component.

FIG. 16B shows the frequency characteristic of the engine revolution speed, i.e., the output of the digital filter after the elimination of the tire (road) wheel revolution (revolution) first-order vibration frequency component. It is noted that, in FIGS. 16A and 16B, the longitudinal axis denotes the gain (unit dB).

The combustion stability factor estimating block shown in FIG. 15 is installed within the control unit 4 and estimates the combustion stability factor, receiving the output signal from the digital filter at the steps SS1 through SS3 via a band pass filter as will be described later.

Figure 13:
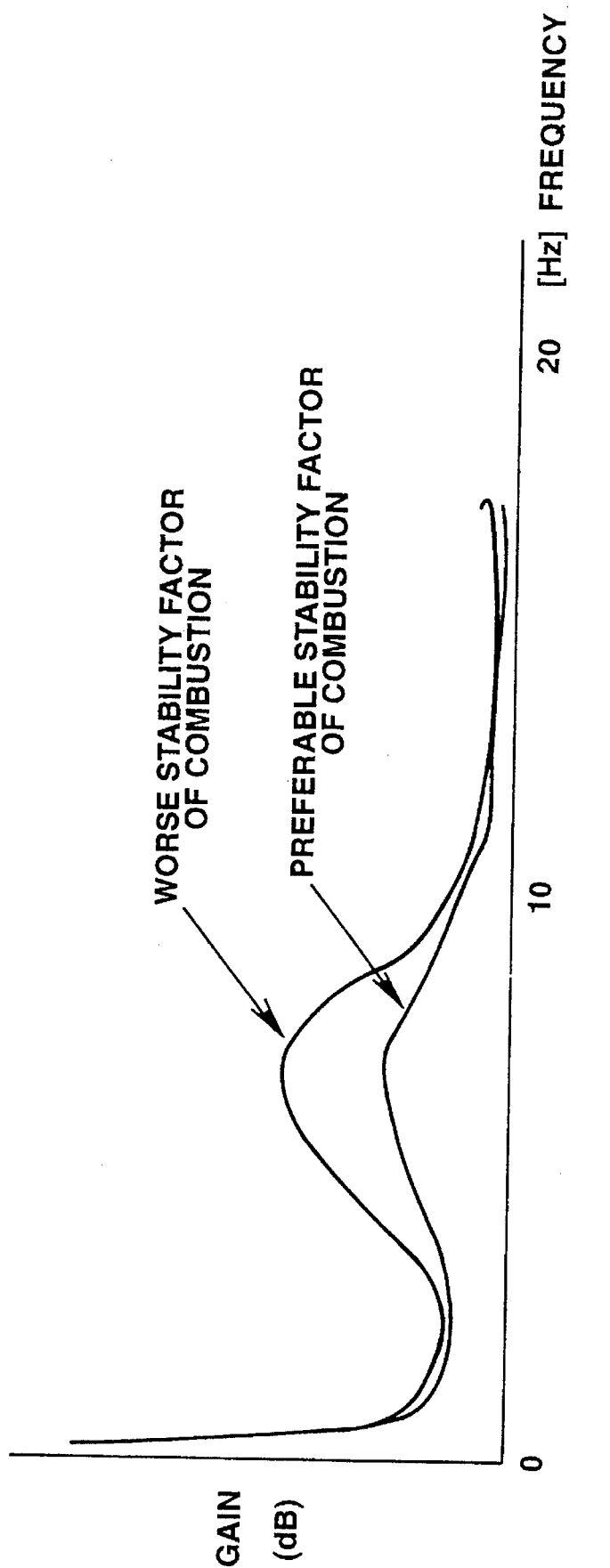
FIG. 13 is an explanatory view for explaining high and low stability factors of combustion with respect to the engine revolution frequency component.

That is to say, the influence of the instability of combustion stability factor of the internal combustion engine appears in a largest manner on the components having frequencies placed in the proximity to the resonance frequency of the vehicular drive train. The resonance frequency of the drive train is approximately determined according to each of the gear ratios of the power transmission. Therefore, the band pass filter ( time synchronization digital filter, for example, IIR type filter as described in the first embodiment ) serves to extract all of the resonance frequencies to all possible gear shift ratios or extract the components whose frequencies are placed in the proximity to (or a frequency band having a predetermined width) the present resonance frequency of the drive train from the output signal of the above-described digital filter shown in FIG. 15. Since an amplitude of the extracted and output waveform of: the band pass filter is increased as the combustion in the engine becomes unstable as appreciated from FIG. 13. The value corresponding to the amplitude average of the output waveform in time set according to the required estimation speed and accuracy is the index of the combustion stability. Then, the above-described amplitude is compared with one or more comparison values previously set to enable the quantitative estimation of the combustion stability factor.

It should be noted that since, in FIG. 16B, the tire wheel revolution first-order vibration frequency component is eliminated so that this frequency portion is apparently recessed as shown in FIG. 16B, thus the above-described index being reduced as compared with a real combustion stability factor. Consequently, although the detection (estimation) frequency is consequently eliminated, the estimation accuracy at tower frequency side is deceptively reduced. However, since the frequency characteristic of FIG. 16B is exhibited with the longitudinal axis actually expressed in terms of a logarithm, the estimation accuracy would not be reduced. This is because the recessed part becomes exponentially reduced as compared with the amplitude of the tire wheel revolution first-order vibration frequency component before the elimination thereof as shown in FIG. 16A. Hence, it is possible to improve remarkably the estimation accuracy of combustion stability factor by eliminating the tire wheel revolution first-order vibration frequency component.

Then, the combustion stability factor control (air-fuel mixture fuel) based on the combustion stability estimated accurately can be carried out by adjusting the fuel injection quantity from the plurality of fuel injection valves 3. In details, in a case where the combustion stability factor is worse, the fuel injection quantity is increased to stabilize the combustion. On the contrary, in a ease where the combustion stability factor is preferable, the fuel injection quantity to the engine is reduced to improve the fuel consumption and exhaust characteristic in a predetermined range in which the combustion stability fails. The present invention is applicable to an exhaust gas recirculation (EGR) system through which part of exhaust gas is induced into the intake air system of the engine, in which the quantity of exhaust gas recirculation is increased and decreased during the control of exhaust gas recirculation so that the combustion stability factor falls in the predetermined range.

A U.S. Pat. No. 4,466,416 issued on Aug. 21, 1984 exemplifies the EGR control system (the disclosure of which is herein incorporated by reference). A U.S. Pat. No. 4,782, 806 issued on Nov. 8, 1988 exemplifies the fuel injection system for the internal combustion engine ( the disclosure of which is herein incorporated by reference).

As described hereinabove, in the combustion stability Factor estimating apparatus and method according to the present invention, the filter processing synchronized with the engine revolutions is carried out for the signal derived in synchronization with the engine revolutions and thereafter the frequency component correlated to the engine combustion stability factor is extracted. Therefore, the noise components synchronized with the engine revolutions and based on the sensor working accuracy error and based on the tire wheel revolution first-order vibration frequency can be eliminated so that the engine combustion stability factor can highly accurately be estimated.

In addition, since the resonance frequency component of the vehicular drive train is extracted as the frequency component correlated to the engine combustion stability factor, the frequency component having the great influence on the stability of the engine combustion can be extracted so that the stabilized control based on the estimation of the combustion stability factor call be improved.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An apparatus for a vehicular internal combustion engine, comprising:

a) a revolution synchronizing filter which is so constructed and arranged as to be activated in synchronization with an engine revolution or a revolution of a rotatable vehicular member associated with the internal combustion engine and as to filter a signal related to the engine revolution;

b) a time synchronizing filter which is so constructed and arranged as to be activated in synchronization with time and as to filter a frequency component passed through said revolution synchronizing filter; and c) engine combustion stability factor estimating means for estimating the stability factor of combustion of the internal combustion engine on the basis of an extracted frequency component by said time synchronizing filter.

2. An apparatus for a vehicular internal combustion engine, comprising:

a) reference signal outputting means for outputting a reference signal whenever the engine has rotated through a predetermined angle;

b) time measuring means for measuring a generation time interval of the reference signal output from said reference signal outputting means;

c) revolution synchronizing filtering means, activated in synchronization with the generation of the reference signal, for filtering data of the measured time interval or data of an engine revolution speed to which the data of the measured time interval is converted;

d) time synchronizing filtering means, activated in synchronization with a predetermined time interval, for filtering a filter processed signal from the revolution synchronizing filter means and for extracting a frequency component correlated to a combustion stability factor of the engine; and f) engine combustion stability factor estimating means for estimating the stability factor of combustion of the engine on the basis of the extracted frequency component by said time synchronizing filtering means.

3. An apparatus for a vehicular internal combustion engine as claimed in claim 2, wherein the predetermined frequency component eliminated by the revolution synchronizing filtering means includes the frequency component caused by an output characteristic error from said reference signal outputting means.

4. An apparatus for a vehicular internal combustion engine as claimed in claim 3, wherein the vehicular internal combustion engine is a four-cycle multiple-cylinder engine, said reference signal outputting means is attached onto a cam shaft of the engine, and wherein, when the number of cylinders is denoted by m, said revolution synchronizing filter means eliminates noise frequency components expressed as $[i/2]/m$ with respect to a normalized frequency of each frequency of noise frequency component divided by an output frequency of the reference signal of said reference signal outputting means, in $[i/2]/m$, $i=1, 2, ---, m$ and denoting a Gauss' notation.

5. An apparatus for a vehicular internal combustion engine as claimed in claim 4, wherein, when the number of cylinders m of the engine is four, the revolution synchronizing filtering means eliminates the noise frequency components of 0, 0.25, and 0.5 with respect to the normalized frequency.

6. An apparatus for a vehicular internal combustion engine as claimed in claim 5, wherein said revolution synchronizing filtering means comprises: a band pass filter (BPF1) having a z-transformed transfer function as follows:

$$H(z)=(a_1-1)^2(1-z^{-2})/\{(a_1{}^2-(a_1-2)^2z^{-2}\}$$

and a first band rejection filter (BRF1) having a z-transformed transfer function as follows:

$$H(z)=(a_2-1)(1+z^{-2})/\{a_2+(a_2-2)z2\},$$

$a_1$ and $a_2$ denoting arbitrary integers.

7. An apparatus for a vehicular internal combustion engine as claimed in claim 2, wherein the engine has an output shaft, the output shaft being linked to said power transmission, an output shaft of said power transmission being so constructed as to transmit an output to driven road wheels via said drive power train and wherein the predetermined frequency component eliminated by the revolution synchronization filtering means includes a frequency component caused by a rotational strain on a rotational member constituting the drive power train disposed between the power transmission and the driven road wheels.

8. An apparatus for a vehicular internal combustion engine as claimed in claim 8, which further comprises: gear shift ratio determining means for determining a present gear shift ratio of said power transmission; and filter coefficient setting means for setting a filter coefficient in accordance with a predetermined frequency of the predetermined frequency component on the basis of the detected gear shift ratio, and wherein said revolution synchronizing filtering means filters either the data of the measured time interval or the data of the engine revolution speed derived with the data of the measured time interval converted thereinto using the set filter coefficient so as to eliminate the frequency component caused by the rotational strain on the rotational member in the drive power train.

9. An apparatus for a vehicular internal combustion engine as claimed in claim 8, wherein said power transmission includes a manual power transmission, which further includes vehicle speed estimating means for estimating a vehicular speed, and wherein said gear shift estimating means detects the gear shift ratio on the basis of the data of the measured time interval by said time interval measuring means and vehicle speed detected by the vehicle speed estimating means.

10. An apparatus for a vehicular internal combustion engine as claimed in claim 8, wherein said power transmission is a torque converter mounted automatic power transmission having a lock-up function and wherein said gear shift ratio estimating means detects the gear shift ratio corresponding to a command signal to shift a gear shift position which is given from an automatic power transmission control system to the automatic power transmission during the functioning of the lock-up.

11. An apparatus for a vehicular internal combustion engine as claimed in claim 8, wherein said revolution synchronizing filter means comprises a band rejection filter (BRF2):

$$H(z^{-1})=(\alpha-2\alpha\beta z^{-1}+\alpha z^{-2})/\{1-2\alpha\beta z^{-1}+(2\alpha-1)z^{-2}\}, \quad 0<\alpha<1 \text{ and } -1\leq\beta\leq 1,$$

and wherein $\alpha$ denotes a constant generally determining a rejection frequency band width of said band rejection filter (BRF2) and $\beta$ denotes a constant defined according to the rejection frequency by said band rejection filter determined according to a normalized revolution frequency of an engine output shaft and gear shift ratio $N_w$.

12. An apparatus for a vehicular internal combustion engine as claimed in claim 2, wherein the frequency component correlated to the combustion stability factor of the engine extracted by the time synchronizing filtering means is a resonance frequency component in the drive power train from the power transmission to the driving road wheels via the drive power transmitting means.

13. An apparatus for a vehicular internal combustion engine as claimed in claim 12, wherein said time synchronizing filtering means comprises a band pass filter of an Infinite Impulse Response type as $$F(z^{-1}) = \sum_{n=1}^{k} A_n \cdot Z^{-n} / \sum_{n=1}^{k} B_n \cdot Z^{-n}.$$

14. An apparatus for a vehicular internal combustion engine as claimed in claim 13, wherein said set filter coefficient of the band pass filter is varied according to the detected gear ratio.

15. An apparatus for a vehicular internal combustion engine as claimed in claim 13, wherein an index of the combustion stability factor is an average amplitude in an output waveform from said band pass filter.

16. An apparatus for a vehicular internal combustion engine as claimed in claim 2, which further comprises fuel injection quantity controlling means for controlling an air/fuel mixture ratio through at least one fuel injection valve disposed in the engine on the basis of the result of the combustion stability factor detected by said combustion stability factor estimating means.

17. An apparatus for a vehicular internal combustion engine as claimed in claim 2, which further comprises engine ignition timing controlling means for controlling an ignition timing of the engine on the basis off the result of the combustion stability factor by said combustion stability factor estimating means.

18. An apparatus for a vehicular internal combustion engine as claimed in claim 2, which further comprises exhaust gas recirculation controlling means for controlling an exhaust gas recirculation quantity on the basis of the result of the combustion stability factor by said combustion stability factor estimating means.

19. An apparatus for a vehicular internal combustion engine, comprising:

a) reference signal outputting means for outputting a reference signal for each rotational angle of the engine;

b) time interval measuring means for measuring a generation time interval of the reference signal;

c) drive power train revolution synchronization signal outputting means for outputting a revolution synchronization signal whenever a drive power train subsequent to an output of a power transmission connected to the engine has rotated through a predetermined angle;

d) revolution synchronizing filtering means, activated in synchronization with the revolution synchronization signal of the drive power train revolution synchronization signal outputting means, for filtering either of data of the measured time interval data or data of an engine revolution speed derived with the data of the measured time interval converted thereinto so as to eliminate at least one predetermined frequency component from the data;

e) time synchronizing filtering means, activated whenever a predetermined period of time has passed, for further filtering the filtered data by said revolution synchronization filtering means so as to extract at least one frequency component having a correlation to a stability factor of combustion of the engine; and f) engine combustion stability factor estimating means for estimating the stability factor of combustion of the engine on the basis of the extracted frequency component by said time synchronizing filtering means.

20. An apparatus for a vehicular internal combustion engine as claimed in claim 19, wherein said revolution synchronizing filter means comprises a band rejection filter (BRF2):

$$H(z^{-1})=(\alpha-2\alpha\beta z^{-1}+\alpha z^{-2})/\{1-2\alpha\beta z^{-1}+(2\alpha-1)z-2\}, \quad 0<\alpha<1 \text{ and } -1\leq\beta 1,$$

and wherein $\alpha$ denotes a constant generally determining a rejection frequency band width of said band rejection filter (BRF2) and $\beta$ denotes a constant defined according to the rejection frequency by said band rejection filter determined according to a normalized revolution frequency of an engine output shaft.

21. An apparatus for a vehicular internal combustion engine as claimed in claim 19, wherein the frequency component correlated to the combustion stability factor of the engine extracted by the time synchronizing filtering means is a resonance frequency component in the drive power train from the power transmission to the driving road wheels via the drive power transmitting means.

22. An apparatus for a vehicular internal combustion engine as claimed in claim 21, wherein said time synchronizing filtering means comprises a band pass filter of an Infinite Impulse Response type as $$F(z^{-1}) = \sum_{n=1}^{k} An \cdot Z^{-n} / \sum_{n=1}^{k} Bn \cdot Z^{-n}.$$

23. An apparatus for a vehicular internal combustion engine as claimed in claim 22, wherein said set filter coefficient of the band pass filter is varied according to the detected gear ratio.

24. An apparatus for a vehicular internal combustion engine as claimed in claim 22, wherein an index of the combustion stability factor is an average amplitude in an output waveform from said band pass filter.

25. An apparatus for a vehicular internal combustion engine as claimed in claim 19, which further comprises fuel injection quantity controlling means for controlling an air/fuel mixture ratio through at least one fuel injection valve disposed in the engine on the basis of the result of the combustion stability factor detected by said combustion stability factor estimating means.

26. An apparatus for a vehicular internal combustion engine as claimed in claim 19, which further comprises engine ignition timing controlling means for controlling an ignition timing of the engine on the basis of the result of the combustion stability factor by said combustion stability factor estimating means.

27. An apparatus for a vehicular internal combustion engine as claimed in claim 19, which further comprises exhaust gas recirculation controlling means for controlling an exhaust gas recirculation quantity on the basis of the result of the combustion stability factor by said combustion stability factor estimating means.

28. A method for estimating a combustion stability factor of a vehicular internal combustion engine, comprising the steps of:
- a) outputting a reference signal whenever the engine has rotated through a predetermined angle;
- b) measuring a generation time interval of the reference signal output from said step a);
- c) being activated in synchronization with the generation of the reference signal, filtering data of the measured time interval or data of an engine revolution speed to which the data of the measured time interval is converted; and
- d) being activated in synchronization with a predetermined time interval, filtering a filter processed signal from the revolution synchronizing filter step c) and extracting a frequency component correlated to a combustion stability factor of the engine.

* * * * *